United States Patent [19]

Britten et al.

[11] Patent Number: 4,622,467

[45] Date of Patent: Nov. 11, 1986

[54] SYSTEM FOR MAPPING RADIOACTIVE SPECIMENS

[75] Inventors: Roy J. Britten, Costa Mesa; Eric H. Davidson, Pasadena, both of Calif.

[73] Assignee: California Institute of Technology, Pasadena, Calif.

[21] Appl. No.: 682,533

[22] Filed: Dec. 17, 1984

Related U.S. Application Data

[63] Continuation-in-part of Ser. No. 660,692, Oct. 15, 1984, which is a continuation-in-part of Ser. No. 370,333, Apr. 21, 1982, Pat. No. 4,500,786.

[51] Int. Cl.⁴ .............................................. G01T 1/185
[52] U.S. Cl. ..................................................... 250/389
[58] Field of Search ........................ 250/374, 385, 389

[56] References Cited

U.S. PATENT DOCUMENTS

| | | | |
|---|---|---|---|
| 3,373,283 | 3/1968 | Lansiart et al. | 250/389 |
| 3,449,573 | 6/1969 | Lansiart et al. | 250/389 |
| 3,461,293 | 8/1969 | Horwitz | 250/389 |
| 3,717,766 | 2/1973 | Allard et al. | 250/389 |
| 3,723,788 | 3/1973 | Goto | 250/389 |
| 4,500,786 | 2/1985 | Britten et al. | 250/389 |
| 4,527,064 | 7/1985 | Anderson | 250/389 |

OTHER PUBLICATIONS

Parkhomchuck et al., "A Spark Counter with Large Area," *Nuc. Inst. & Methods,* 93, No. 2 (1971), 269–270.

*Primary Examiner*—Janice A. Howell
*Attorney, Agent, or Firm*—Leonard Tachner

[57] ABSTRACT

A system for mapping radioactive specimens comprises an avalanche counter, an encoder, pre-amplifier circuits, sample and hold circuits and a programmed computer. The parallel plate counter utilizes avalanche event counting over a large area with the ability to locate radioactive sources in two dimensions. When a beta ray, for example, enters a chamber, an ionization event occurs and the avalanche effect multiplies the event and results in charge collection on the anode surface for a limited period of time before the charge leaks away. The encoder comprises a symmetrical array of planar conductive surfaces separated from the anode by a dielectric material. The encoder couples charge currents, the amplitudes of which define the relative position of the ionization event. The amplitude of coupled current, delivered to pre-amplifiers, defines the location of the event.

12 Claims, 20 Drawing Figures

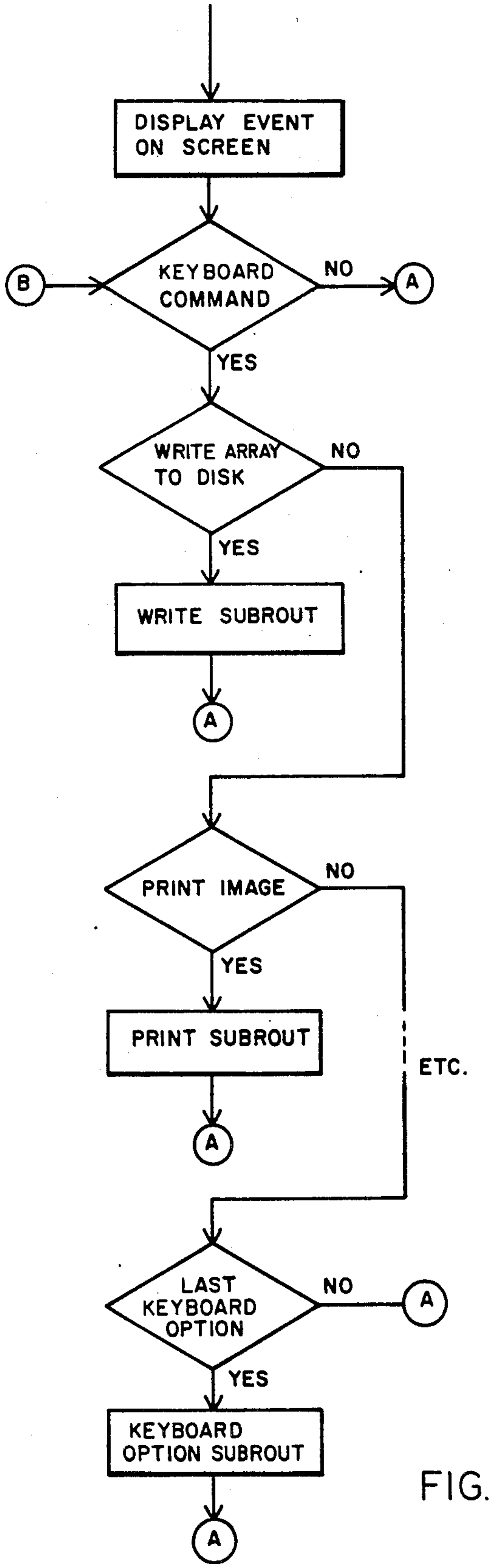
FIG. 17b
| | | | | | | | | | | | | | | | | | | | |
|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 1 | 0 | 6 | 0 | 0 | 0 | 0 |
| 0 | 0 | 0 | 0 | 0 | 0 | 0 | 0 | 0 | 0 | 0 | 0 | 1 | 1 | 7 | 6 | 6 | 0 | 0 | 0 |
| 0 | 0 | 0 | 0 | 0 | 0 | 0 | 0 | 0 | 0 | 0 | 0 | 0 | 1 | 0 | 6 | 0 | 0 | 0 | 0 |
| 0 | 0 | 0 | 0 | 0 | 0 | 0 | 0 | 0 | 0 | 0 | 0 | 12 | 0 | 0 | 0 | 0 | 3 | 0 | 0 |
| 0 | 0 | 0 | 0 | 0 | 0 | 0 | 0 | 0 | 0 | 0 | 12 | 25 | 12 | 0 | 0 | 3 | 3 | 3 | 0 |
| 0 | 0 | 0 | 0 | 0 | 0 | 0 | 0 | 0 | 0 | 0 | 12 | 25 | 12 | 0 | 0 | 0 | 3 | 0 | 0 |
| 0 | 0 | 0 | 0 | 0 | 0 | 0 | 3 | 0 | 0 | 0 | 25 | 12 | 25 | 0 | 0 | 9 | 0 | 0 | 0 |
| 0 | 0 | 0 | 0 | 0 | 0 | 3 | 3 | 3 | 0 | 25 | 25 | 50 | 25 | 25 | 9 | 9 | 9 | 0 | 0 |
| 0 | 0 | 0 | 0 | 0 | 0 | 0 | 3 | 0 | 0 | 0 | 25 | 0 | 25 | 0 | 0 | 9 | 0 | 0 | 0 |
| 0 | 0 | 0 | 0 | 0 | 0 | 6 | 0 | 0 | 0 | 0 | 0 | 0 | 0 | 0 | 0 | 0 | 0 | 0 | 0 |
| 0 | 0 | 0 | 0 | 0 | 6 | 6 | 6 | 0 | 0 | 0 | 0 | 0 | 0 | 0 | 0 | 0 | 0 | 0 | 0 |
| 0 | 0 | 0 | 0 | 0 | 0 | 6 | 0 | 0 | 0 | 0 | 0 | 0 | 0 | 0 | 0 | 0 | 0 | 0 | 0 |
| 0 | 0 | 0 | 0 | 3 | 0 | 0 | 25 | 0 | 0 | 0 | 0 | 0 | 0 | 0 | 0 | 0 | 0 | 0 | 0 |
| 0 | 0 | 0 | 3 | 3 | 9 | 25 | 37 | 25 | 25 | 0 | 0 | 0 | 0 | 0 | 0 | 0 | 0 | 0 | 0 |
| 0 | 0 | 0 | 0 | 9 | 6 | 18 | 37 | 37 | 25 | 25 | 0 | 0 | 0 | 0 | 0 | 0 | 0 | 0 | 0 |
| 0 | 0 | 0 | 0 | 0 | 6 | 0 | 12 | 0 | 31 | 0 | 0 | 0 | 0 | 0 | 0 | 0 | 0 | 0 | 0 |
| 0 | 0 | 0 | 0 | 0 | 0 | 0 | 0 | 6 | 6 | 6 | 0 | 0 | 0 | 0 | 0 | 0 | 0 | 0 | 0 |
| 0 | 0 | 0 | 0 | 0 | 0 | 0 | 0 | 0 | 6 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
FIG. 18
FIG. 19

SYSTEM FOR MAPPING RADIOACTIVE SPECIMENS

BACKGROUND OF THE INVENTION

Cross Reference to Related Applications

This application is a continuation-in-part of patent application Ser. No. 660,692 filed Oct. 15, 1984 which is a continuation-in-part of patent application Ser. No. 370,333 filed on Apr. 21, 1982, now U.S. Pat. No. 4,500,786.

FIELD OF THE INVENTION

The present invention relates to a system for detecting and mapping the distribution of radioactive sources over a predefined area and more particularly, to a system comprising a two dimensional avalanche counter, a position encoder for precisely ascertaining the frequency of occurrence and location of particles or rays generated by radioactive sources, a plurality of pre-amplifier circuits, sample and hold circuits and a specially programmed computer. The system comprises a time-saving mapping and analysis device that is particularly useful for screening recombinant DNA.

Prior Art

A recombinant DNA is a synthetic DNA molecule containing genes from two or more different organisms. In recent years recombinant DNA has become an important tool in genetic engineering. The use of recombinant DNA permits many copies of a desired genetic region to be replicated thereby permitting analysis of gene arrangement by molecular techniques. Typically, the process involved includes the production of molecular clones by introducing recombinant DNAs into bacteria, usually a bacterial virus commonly referred to as phage or bacteriophage. The molecular clones produced in this fashion are then typically analyzed for those that obtain the desired gene or genes. In order to isolate bacterial clones to be analyzed, the recombinant DNA bearing bacteria is screened for the desired DNA. In this process the bacterial clones to be analyzed are replicated so that analysis does not destroy the clone. The bacteria can then be lysed and their DNA liberated. Typically, the DNA is liberated directly onto a nitrocellulose filter and then made radioactive by hybridizing radioactive RNA or complementary DNA to the DNAs on the filter. The filters are then rinsed making them ready for DNA location and isolation by a process called autoradiography. This is an example of one of the many uses of autoradiography in recombinant DNA and other molecular biological research. It is to this process known as autoradiography, namely, a process for locating radioactive DNAs on a filter, that the present invention is particularly directed.

Generally speaking, prior art autoradiography has relied upon the radioactive effect in creating an image on photographic film or X-ray film. Unfortunately, such prior art methods require that the film be exposed for very long periods of time such as days or even weeks in order to produce a visualization of the distribution and amounts of radioactively-labelled molecules. Such lengthy periods required to produce autoradiographs utilizing X-ray or photographic film, can be extremely disadvantageous and costly. As a result, a number of alternative faster techniques, including some borrowed from the nuclear particle physics art, have been considered for use in the DNA screeening process for autoradiographic location of radioactive DNAs. However such prior art devices are either too cumbersome, too costly, cover too small an area or lack adequate spatial resolution. By way of example, a number of pertinent devices are disclosed in the following patents:

U.S. Pat. No. 3,717,766 Allard et al
U.S. Pat. No. 3,461,293 Horowitz
U.S. Pat. No. 3,449,573 Lansiart et al
U.S. Pat. No. 3,975,639 Allemand
U.S. Pat. No. 3,373,283 Lansiart et al Other relevant prior art has been disclosed in the parent application, Ser. No. 370,333 filed on Apr. 21, 1983 and that prior art discussion is hereby incorporated by reference into the present application.

SUMMARY OF THE INVENTION

The present invention comprises a simply constructed parallel plate counter that utilizes avalanche event counting over a large area with the ability to locate radioactive sources in two dimensions. The counter has the capacity for simultaneously registering radioactivity over a large area and is useful for a variety of laboratory applications including gel electrophoresis of DNA fragments and thin layer chromatography. The counter comprises a thin stretched stainless steel window cathode spaced from a flat anode surface. When a beta ray or other radioactive particle or ray enters the space between the cathode and anode, an ionization event occurs in a filling gas contained within that space. The ionization event results in an avalanche of ionization multiplying the event by almost one hundred million. The charge rests for a short time on the surface of the anode and then leaks away. A plurality of electrical pickups provide means for processing a current induced by each avalanche event.

The invention also comprises an encoder system designed to permit calculation and definition of the position of each such event. In one embodiment, the coding surface used with the counter comprises a modest number of square electrical conducting sheets which are almost contiguous to one another. It is believed that this coding system is unique because of the way in which the signal is distributed between adjacent coding elements. The avalanche ion current is collected on the anode surface which is a small distance from the coding surface. As a result, the induced signal spreads to several coding elements. The charge is capacitively coupled to several coding elements. The resulting signal distribution is almost linearly dependent on the event position from the center of one element to its edge. During the counting process the formation of an avalanche in a high electric field strength in a gas mixture delivers an average of about one picocoulomb to the anode surface for every primary ionization event near the cathode surface due to, for example, a beta ray entering the counter. The electrons are collected quickly on the anode surface and the positive ions migrate in about 10 to 20 microseconds to the cathode. The coding system used to locate the charge employs capacitive coupling between the coding elements and the collected charge. In one embodiment, the coding surface comprises 144 one-half inch squares of conductive silver paint, hand painted on a glass surface. Alternatively, other conductive layers may be used and affixed in any manner. Each square is connected to a two dimensional matrix of conductors, (i.e., to a column conductor with a 10 picofarad capacitor and also to a row conductor with another capacitor of the same value). These capacitors isolate the rows and columns so that interactions between rows and columns are minimized. The coding is solely dependent upon the position of the avalanche in the column and row dimension. Each row and column is connected to a charge integrating amplifier in a coding system that provides a spatial resolution better than 1 millimeter.

Other embodiments of the encoding system are disclosed herein. In one such additional embodiment each coding square is divided into a series of fine interdigitized fingers which are equal in area and therefore transmit a direct half share of the charge to a column and to a row. Still an additional embodiment comprises a structure which consists of many fine wires in perpendicular directions with a spacing of approximately 1/10 of an inch. Each wire is connected to two adjacent wires with precision resistors or capacitors. As will be seen hereinafter this last mentioned embodiment of the encoding system of the present invention provides some significant advantages in both facilitating manufacture and also in providing far more flexibility between the interface of the encoding system and the amplifiers which are used to transfer signals for decoding as will be hereinafter more fully explained.

The system of the present invention also comprises elements which enable the signals produced by the counter and encoding system to be amplified, sampled, selectively held and then transferred to a specially programmed computer for mapping and analysis.

OBJECTS OF THE INVENTION

It is therefore a principal object of the present invention to provide a novel radioactive specimen mapping system having two dimensional avalanche counter for locating radioactive sources over a large area with a resolution sufficient to render the system especially useful for DNA screening and replication.

It is an additional object of the present invention to provide a novel radioactive specimen mapping system having an encoder that is especially adapted for use with the aforementioned counter and which provides the ability to accurately locate a radioactive event detected by the counter whereby to enable mapping of such events that occur over a selected period of time.

It is an additional object of the present invention to provide a radioactive speciment mapping system for locating radioactive sources in two dimensions with high resolution over a large area for detecting lightly ionized particles such as beta rays by generating signals indicative of the location of the detected ionizing event whereby counting and mapping of such events may be accomplished.

It is still an additional object of the present invention to provide a radioactive specimen mapping system having a two dimensional avalanche counter and encoder therefor, the combination having the ability to locate radioactive sources in two dimensions over a large area with high resolution and also having amplifier and sample and hold circuits and a specially programmed computer configured for responding to the occurrence of detected radioactive events for generating histographic mapping of a large plurality of such events in a relatively short period of time.

BRIEF DESCRIPTION OF THE DRAWINGS

The aforementioned advantages and objects of the present invention, as well as additional objects and advantages thereof, will become more apparent hereinafter as a result of a detailed description of preferred embodiments thereof when taken in conjunction with the accompanying drawings in which:

FIG. 17, comprising FIGS. 17*a* and 17*b*, is a flow chart of the mapping program of the invention; and FIGS. 18 and 19 are computer-generated images of the present invention at two different stages of data analysis.

DETAILED DESCRIPTION OF PREFERRED EMBODIMENTS

Figure 1:
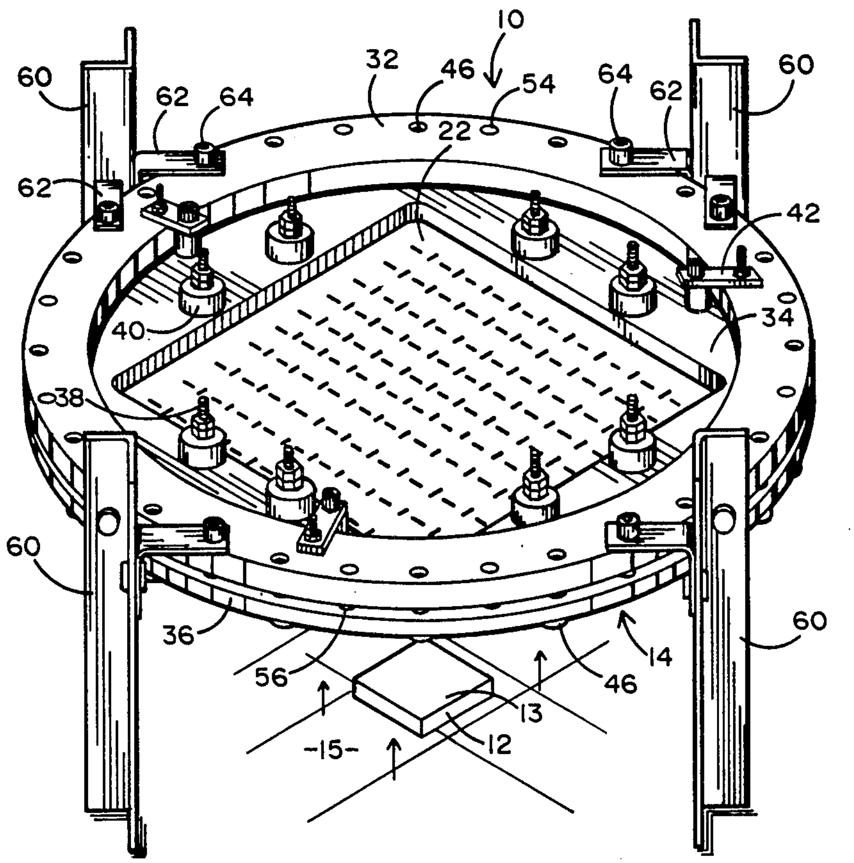
FIG. 1 is an isometric view of the combined two dimensional avalanche counter and encoder system of the present invention in an embodiment that has been reduced to practice.

Reference being had to FIGS. 1, 2, 3 and 4, it will be seen that an avalanche counter and encoder system 10 of the present invention comprises the following principal components: Namely, a cathode membrane 14, an anode surface 18, a pair of glass plates 20 and 22, plate 20 comprising an anode layer and 22 comprising a coding surface support layer. In addition the invention comprises a plurality of coding surface elements 24, a plurality of coupling capacitors 26 and a series of matrix configured wires 28, each such wire connected to a charge sensitive preamplifier 30. As seen best in FIG. 2, cathode membrane 14 is spaced from anode layer 20 to form a chamber 16 therebetween occupied by a selected gas mixture to be described hereinafter. The anode layer 20 is preferably coated with a high resistance anode surface coating 18 facing the chamber 16 and an electric field is applied between the anode surface 18 and the cathode membrane 14 by applying a relative direct current voltage therebetween of, for example, 5,000 volts. The two layers 20 and 22 are in physical contact with one another and the surface of coding support layer 22 opposite layer 20 is coated with a plurality of coding surface elements 24. In fact each such coding surface element is a square-shaped, highly conductive material such as silver that is in effect painted onto the coding surface support layer 22 and each is capacitively coupled by capacitors 26 to a conductive matrix wire 28 which is in turn connected to a charge sensitive preamplifier 30.

Figure 3:
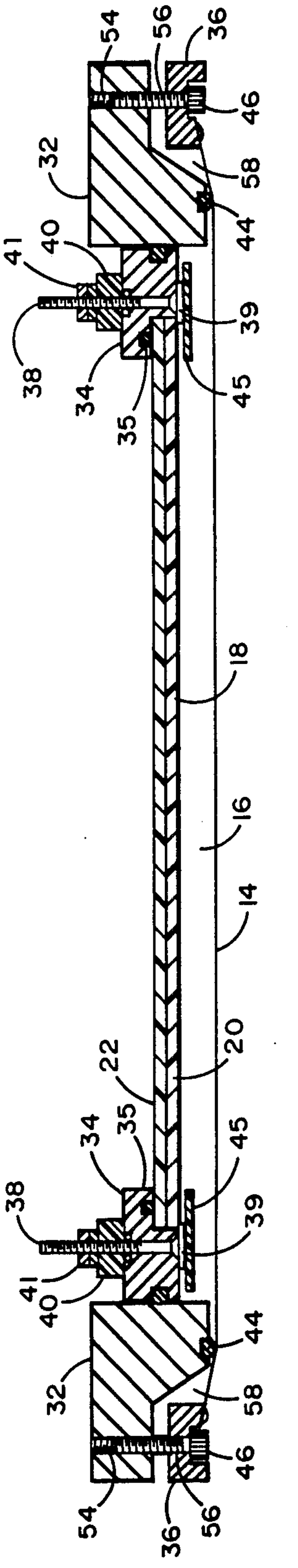
FIGS. 3 and 4 provide respective cross-sectional views of the detailed structure of the embodiment of the invention shown in FIG. 1.
Figure 4:
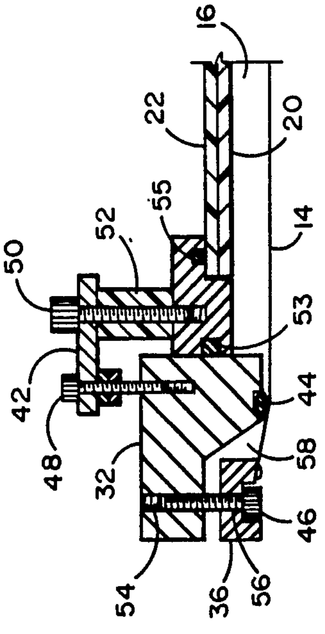

The structural relationship between the various principal components of the avalanche counter and encoder system 10 of the present invention may be more fully appreciated by reference to FIGS. 1, 3 and 4. As seen in those figures, the system 10 is elevated above a test specimen 12 upon which is located a radioactive workpiece 13. Workpiece 13 and test specimen 12 rest on a vertically adjustable surface 15 for being raised into position whereby radioactive workpiece 13 comes into substantial contact with cathode membrane 14. Typically, much larger workpieces can be accommodated. Workpiece 13 is shown smaller for purposes of clarity. One principal structural component of avalanche counter and encoder system 10 is a window support ring 32 which in the particular embodiment illustrated, comprises an annular-shaped aluminum alloy ring having a 24 inch outer diameter and an 18 inch inner diameter and a vertical thickness of approximately 2 inches. Lying within the window support ring 32 in substantially contiguous concentric relation thereto is an anode support 34 typically made of a high dielectric material such as Kevlar. As seen best in FIG. 4, anode support 34 is secured to the window support ring 32 by a plurality of ring/support interconnects 42 spaced at substantially regular intervals around the inner perimeter of window support ring 32. Each such ring/support interconnect 42 is secured to window support ring 32 by a bolt 48 and to anode support 34 by a bolt 50 spaced therefrom by a properly dimensioned spacer 52.

As seen best in FIGS. 1 and 3, a major central portion of anode support 34 is cut out to form a substantially square outline with rounded corners. This cutout is adapted to receive the pair of glass layers 20 and 22. As seen further in FIG. 9, the substantially square cutout is configured to have the flange surface 35 extending therefrom and adapted to receive the glass layers 20 and 22 in overlapping engagement therewith and to provide sealing contact with the coating surface of glass layer 22 by means of an O-ring 55 extending around the square cutout. The two glass layers 20 and 22 are secured to the anode support 24 by means of a glass holder pin 38 to the threaded end of which extends upwardly through anode support 34 and is secured thereto by a dielectric washer 40 and one or more nuts 41. The lower end of glass holder pin 38, which extends into the chamber 16, is capped with a retaining heads 39 configured to partially overlap the edge of surface 18 of anode layer 20. In this manner, the glas layers 20 and 22 are held in secure compressive engagement with anode support 34. A teflon annular ring 45 is preferably secured to the head 39 to prevent inadvertent sparking. As previously indicated, the membrane 14 cooperates with the anode glass layer 20 to form a gas filled chamber therebetween, the purpose of which will be more fully described hereinafter. In order to seal chamber 16, window support ring 32 and anode support 34 are each provided with suitable slots for receiving a membrane O-ring 44 and a sealing O-ring 53, respectively. Sealing O-ring 53 provides a gas-tight seal between window support ring 32 and anode support 34 while membrane O-ring 44 provides a gas-tight seal between membrane 14 and window support ring 32.

Membrane 14 is a thin stretched stainless steel window spaced about 0.15 inches away from the flat anode surface 18. The membrane is stretched over O-ring 44 by a set of screws 46. Screws 46 are used to secure membrane support ring 36 in relative spaced relation to window support ring 32 forming a gap 58 therebetween. Each screw 46 is threaded to mate with a threaded bolt hole 54 in window support ring 32 as well as with an aligned unthreaded bolt hole 56 in membrane support ring 36.

Cathode membrane 14 is welded to membrane support ring 36 whereby tightening of bolts 46 decreases the gap 58 between window support ring 32 and membrane support ring 36 thereby increasing the radial tension applied to cathode membrane 14 and increasing the sealing engagement between membrane 14 and membrane O-ring 44. In this novel configuration the cathode membrane of window 14 of the present invention may be stretched like a banjo head to provide a smooth and precisely planar surface with which radioactive specimens may be placed in direct contact.

As seen further in FIG. 1, the described structure is supported by a plurality of leg brackets 60 spaced regularly around the periphery of window support ring 32 and membrane support ring 36 and connected thereto by a plurality of angle brackets 62 and corresponding bolts 64. However the manner in which the present invention may be suspended above a test specimen and the manner in which such test specimen is elevated to bring a radioactive workpiece in contact with the membrane of the invention are not deemed to be critical to the present invention nor novel elements thereof.

Figure 11:
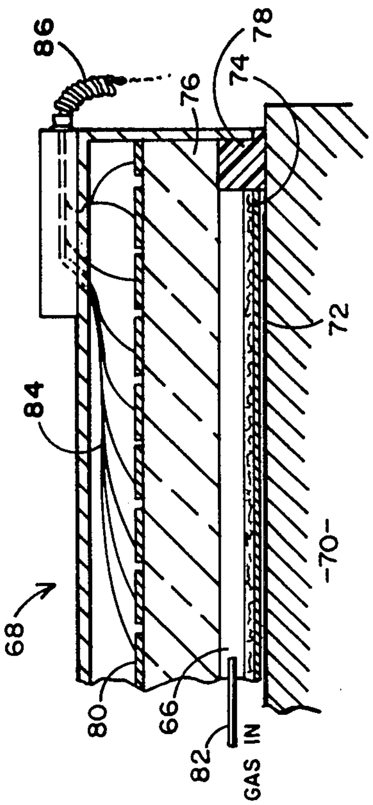
FIG. 11 is a sectional view of an earlier embodiment of a spark chamber configuration of the invention originally disclosed in the parent application.

Although the detailed structural configuration of the present invention as illustrated in the embodiment shown in FIGS. 1, 2, 3 and 4, differs substantially from the details of construction of the spark chamber disclosed in applicant's parent application, now U.S. Pat. No. 4,500,786, some of the basic conceptual design of the embodiment illustrated in the original parent application are relatively similar as reference to FIG. 11 will show. More specifically, as shown in FIG. 11, a previously disclosed embodiment 68 comprises a support surface 70 upon which is located a radioactive workpiece 72 in substantial contact with a thin window 74. Thin window 74 provides one sealing surface of a gas filled chamber 66 which is enclosed by the opposing surface of a layer of semi-conducting glass 76 and a gas retaining seal 78. The surface of semi-conducting glass layer 76 opposite gas filled chamber 66, supports a plurality of conductive strips 80 each of which is electrically connected to a connecting cable 84. All such cables 84 are commonly routed through a single conduit or cable 86 as shown in FIG. 11. Those having skill in the art to which the present invention pertains will observe a number of significant differences between the embodiment illustrated in FIG. 11 and originally disclosed in applicant's parent application and the other embodiments illustrated herein. More specifically, many of the structural details have been improved to permit application of a high voltage DC electric field between the anode and cathode gas of the filled chamber including for example the use of the aforementioned tension controlled "banjo head" type stainless steel membrane which has been substituted for the thin window 74 of the cofiguration illustrated in FIG. 11. Furthermore, in the preferred embodiments, the single semi-conductor glass layer 76 of the earlier embodiment has been replaced by a pair of glass layers as earlier described. However more importantly, the coding surface forming the encoder portion of the present invention has been altered substantially to significantly reduce the complexity of the electronics associated with decoding the detection of a radioactive event and its precise location relative to the invention whereby counting and mapping a large plurality of such events in a short period of time may be more readily accomplished. These novel differences, particularly with respect to the encoding surface, will now be discussed in more detail in conjunction with FIGS. 5–8.

In the embodiments of the invention disclosed for the first time in the present application, the fundamental counting process utilizes the formation of an avalanche ion current induced in a high electric field in the gas mixture to deliver an average of about 1 picocoulomb to the anode for every primary ionization event occurring near the cathode surface due to a beta ray entering the counter. Electrons are collected very quickly on the anode surface and the positive ions migrate in about 10–20 microseconds to the cathode. Due to the induced field from the positive ions, the charge on the anode reaches its maximum value only after the positive ions are collected. Thus, the effective counting event takes about 15 microseconds. The avalanche ion current is collected on the anode surface, which is a small distance from the coding surface. As a result, the induced signals are capacitively coupled to several coding elements. The resulting signal distribution is almost linearly dependent on the event position from the center of one element to its edge. The detailed shape of the distribution pattern is controlled by the thickness of the glass anode support in relation to the size of the coding elements. In one embodiment of the invention shown in FIG. 2 this ratio is about 2-1. The square coding elements are ½ inch on each edge and the anode support layer is ¼ inch thick. The pattern of coding elements 24 almost entirely covers the coding surface and is symmetrical in the row and column directions. As a result, the row signal ratio is not affected by the column signal ratio and vice versa. This independence of row and column signals simplifies any mapping corrections that may be required and facilitates higher speed processing.

Figure 2:
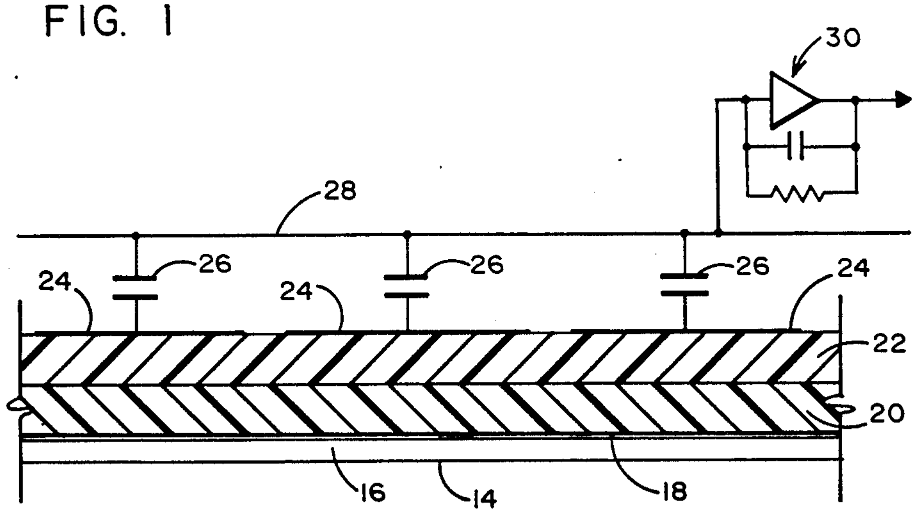
FIG. 2 is a simplified cross-sectional view of the embodiment of the invention illustrated in FIG. 1.

As shown in FIG. 2, each set of coding elements 24 that form a column or row are coupled by capacitors 26 into a common wire conductor 28 which is in turn connected to a charge sensitive integrating pre-amplifier 30. To reduce the number of amplifiers, each entire row and each entire column is connected to a single amplifier. As a result the number of amplifiers is reduced to onlv the sum of the number of elements in one row plus the number of elements in one column and thus varies linearly with the size of the counter for a given resolution. If each coding element were alternatively connected to its own amplifier, then the number of amplifiers would rise as the number of coding elements and thus that number would rise as the square of the size of the counter for a given resolution. Accordingly, a significant savings is achieved by significantly reducing the number of amplifiers.

Each element is a member of a row as well as of a column and therefore each coding element must share its signal equally between a row amplifier and a column amplifier. In the embodiment of FIG. 2 this is accomplished by coupling through equal pairs of capacitors 26. The charge integrating amplifiers such as amplifier 30, have low input impedance so that no significant signal is cross coupled to inappropriate rows or columns through the network of capacitors 26. The resolution of the system can be varied and in fact can be made equal to any desired level by decreasing the size of the coding elements and increasing their total number. Of course the thickness of the anode support glass would then be reduced to maintain the pattern of signal distribution. In practice it has been found that resolution equal to a small fraction of one millimeter is obtained with half inch coding elements. One embodiment of the invention employing the square coding elements and reduced to practice uses 24 amplifiers to code signals from a 7×7 inch counter anode and the spacing between anode and cathode is about 0.15 inches with the counter operating at about 5 kilovolts between anode and cathode.

In another embodiment, namely, a larger counter corresponding to the embodiment illustrated in FIG. 1, the anode is a 12 inch square and the encoder comprises square coding elements of ¾ inches on each side. The cathode window is stretched over a 20 inch diameter O-ring which suppresses the ring to which the window foil is welded. This "banjo head" configuration is uniformly flat over a large area. The method of collecting the signals on the anode surface and capacitively coupling those signals through the insulating glass anode support increases the input impedance seen by the amplifiers. This has the valuable effect of reducing amplifier noise significantly. The semi-conductor layer 18 on the anode surface allows the collected charge to eventually drain off. The semi-conductor surface must have a resistance that is not too small, otherwise the charge collected as a result of each avalanche will leak off in less than the 10–20 microseconds required for collection of the positive ions. The surface resistance and the capacitance to the coding elements sets the rate of flow of charge and the effective charge dissipation time. The upper limit to the resistance is set by the required maximum counting rate. If the resistance is too large a local high count rate region could polarize the anode with undissipated charge and establish a saturation maximum local counting rate. For example, at 120 counts per minute, in one spot the current would be less than 1 nanoamp and the resistivity could be up to 1,000 megohms per square with small effect on the counting rate. The resistance of the semi-conductor layer 18 should be in the 10 to 1,000 megohms per square range.

A number of semi-conducting glass coatings would be suitable for use as coding 18 of FIG. 2. For example, Birox is a suitable semi-conducting glass coating available from the DuPont Company. Birox has a resistivity of 30 megohms per square when melted onto alumina. In another embodiment, anode surface coding 18 was implemented using a carbon filled paint which results in a surface resistance of about 1 gigaohm per square.

In one embodiment of the present invention the coding surface comprises 144 squares of silver hand painted on a glass surface with each square having a dimension of ½ inch on each side. Each square is connected to a column conductor with a 10 picofarad capacitor and also to a row conductor with another 10 picofarad capacitor. These capacitors adequately isolate the rows and columns so that there are no interactions. The coding for position determination is strictly dependent upon the position of the avalanche in each of the row and column dimensions. Each of the 24 conductor lines to which the respective rows or columns are connected, is in turn connected to a charge integrating operational amplifier also called charge sensitive pre-amplifier 30 as seen in FIG. 2. In one configuration each such amplifier is ganged with the amplifier two positions away, that is, the amplifier used for connection to a row or column spaced by two rows or columns. This is one implementation scheme that permits a reduction in the amount of electronics required to process the encoded information, although there is some sacrifice in signal to noise ratio.

Figure 5:
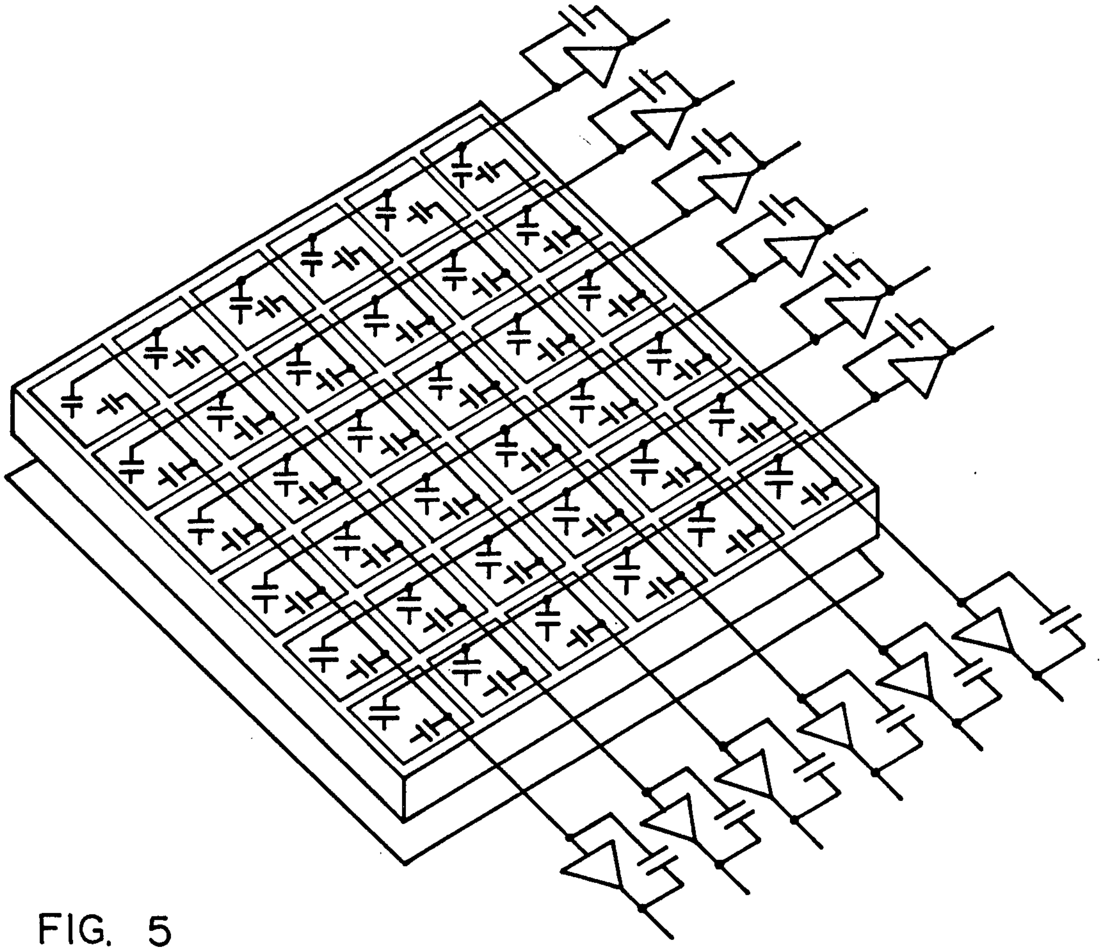
FIGS. 5 and 6 are isometric views, partially schematic in nature, of alternative embodiments of the invention which utilize capacitive coupling from the encoder surface thereof.
Figure 6:
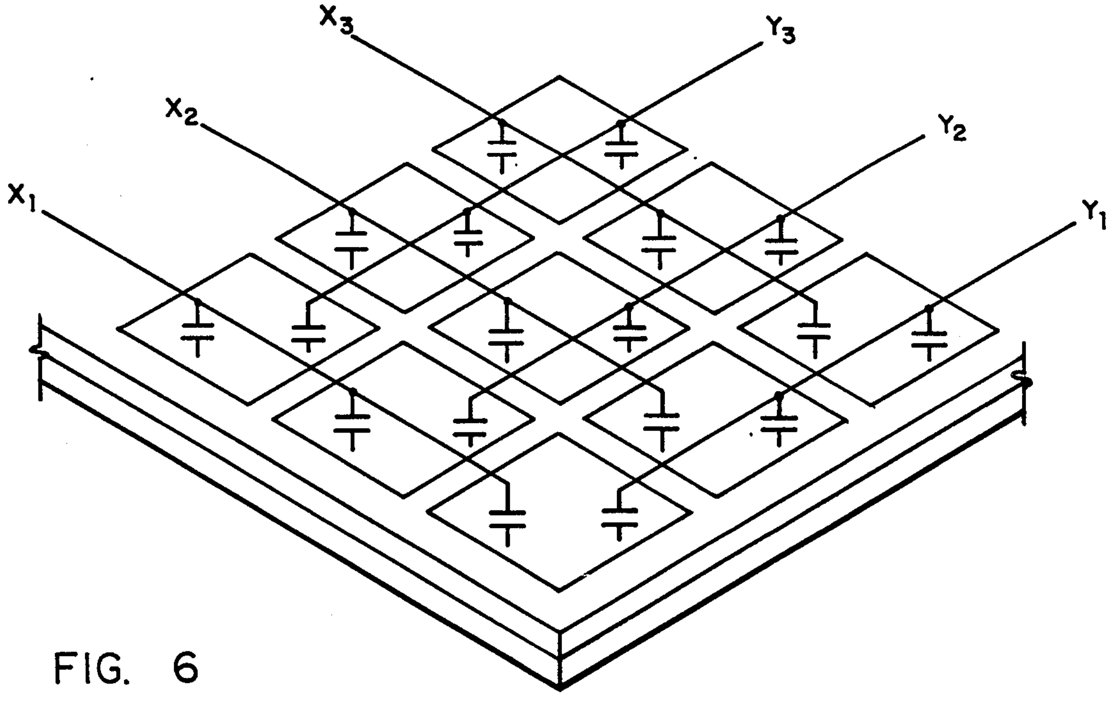

FIGS. 5 and 6 illustrate two different embodiments of the present invention that employ a matrix of square coding elements. Each such element is capacitively coupled to row and column conducting wires. Each such wire is connected to a charge sensitive preamplifier 30 as mentioned previously. FIG. 5 provides an exemplary illustration of a capacitively coupled encoding surface and counter combination in which the counter utilizes a single layer of glass, one side of which is coded with the high resistance anode surface and the other side of which is coded with the plurality of square coding elements as shown in FIG. 5. A slightly different embodiment is shown in FIG. 6. A portion of the encoding elements are shown in an encoding configuration in which two different layers of glass separate the high resistance anode surface coding and the plurality of encoding elements. The single glass layer configuration of FIG. 5 finds closer similarity to the configuration of the invention illustrated in FIG. 11 and originally disclosed in the parent application. However it has been found that the double layer glass configuration of FIG. 6 is more suitable for ease of manufacture and assembly. In either case, electrical charges are induced on more than one coding element as a result of the charge collected on the anode surface. The fraction of the charge induced on the coding elements near the event location depends on the position of the event relative to the neighboring coding elements.

The intervening dielectric medium may be glass as illustrated in the configurations of FIGS. 5 and 6 or maybe in some other material which also has a dielectric constant greater than air so as to efficiently couple the charge at the event location to the coding elements. When an event occurs and a charge is deposited on the anode, an induced charge occurs on the encoding elements leading to a pulse current at the input of the amplifiers connected to the coding elements. The pulse characteristics depend on the distance from the coding element to the charge location. The thickness of the intervening medium between the anode surface and the coding elements is chosen in relation to the coding element size so that only a few coding elements respond to the principal part of the signal while a sufficient number of such elements responds so that sharing of the signal occurs between adjacent coding elements.

The anode surface is coated with a semi-conducting layer which permits the charge to leak away but not before the event is complete and the amplifiers accurately respond to the induced signal. The time constant of this leaking process is set short enough so that the voltage present locally due to repeated events is still so small that it does not interfere with the operation of the counter.

Figure 7:
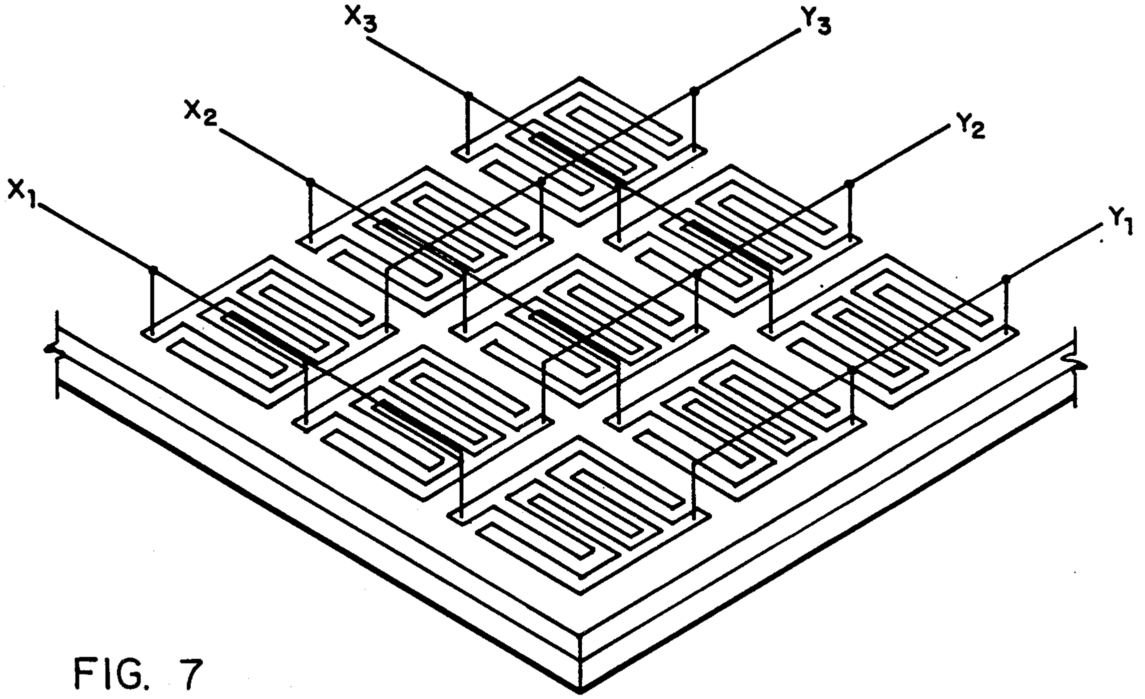
FIGS. 7 and 8 are isometric views, partially schematic in nature, of still additional alternative embodiments of the present invention utilizing other means for coupling the avalanche-induced charge signal from the encoder to circuitry that may be used for defining the position of the charge.
Figure 8:
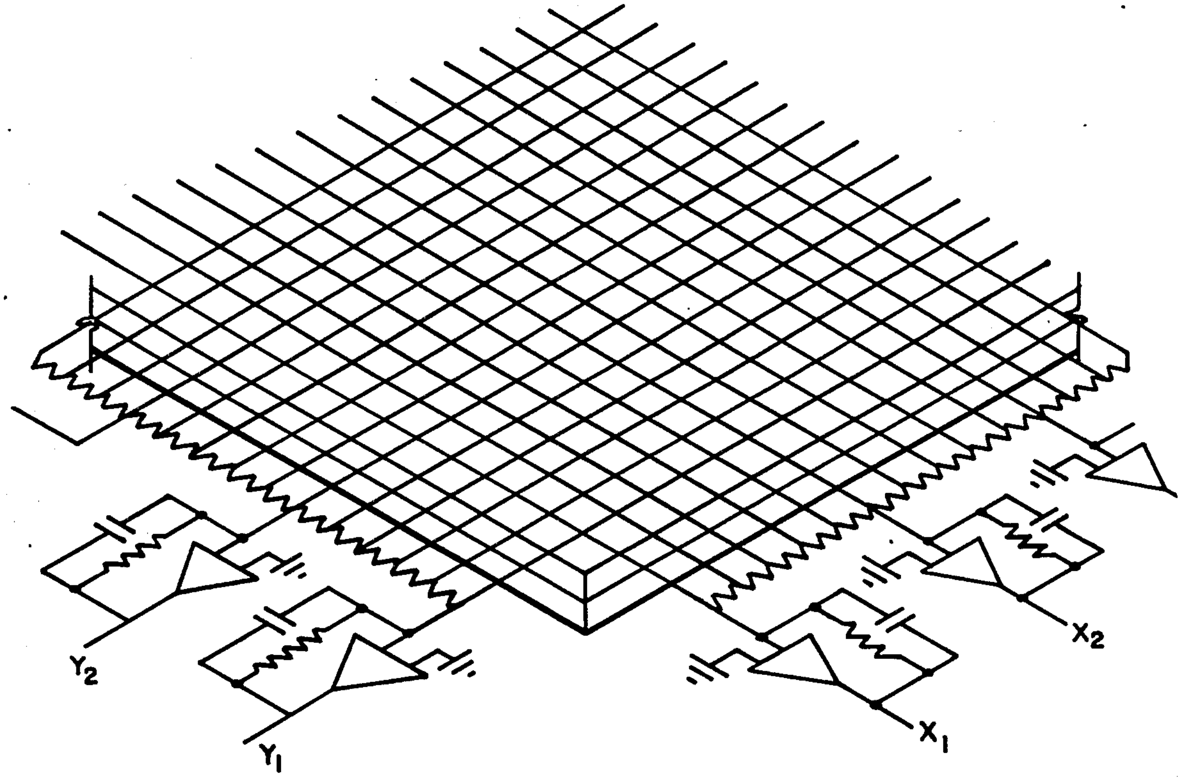

Two additional embodiments of the encoder portion of the present invention are shown in FIGS. 7 and 8, respectively. In the configuration of FIG. 7 each coding square is divided into a series of fine fingers with the fingers of the square for connection to a row conductor being interdigitized with the fingers of the square connected to a column conductor. Each set of fingers of the respective squares takes a direct one half share of the charge because of the equality of area of the respective sets of fingers. Here the charge induced currents are coupled directly between the fingers and the respective column and row conductors. The performance of the coding configuration of FIG. 7 is the same as the coding configuration of FIGS. 5 and 6. However, the interdigitized finger arrangement of FIG. 7 is easier to manufacture and maintain.

The coding configuration of FIG. 8 is fundamentally different and is a significant improvement over the configurations of FIGS. 6 and 7. In this configuration the coding plane comprises a matrix array of fine conducting wires on the coding surface. The wires are 0.010 inches in thickness and are spaced approximately 1/10th of an inch apart to form a grid in the row and column directions with insulation between the row and column isolating the signals that are carried by the respective wires. The wires are preferably formed by either metal deposition or photoetching. The principal advantage of the embodiment of the encoder illustrated in FIG. 8 as compared to previously described embodiments is that the number of amplifiers is independent of the spacing and size of the coding elements. That is, the amplifiers connected to every third wire or alternatively, to every 10th or 100th wire depending upon the service intended. The choice of the number of amplifiers connected is made on the basis of the signal to noise ratio in relationship to the resolution required. Various patterns of amplifier connections can be used with a single grid pattern. Each charge integrator amplifier connection is a low impedance point on an array of resistors or capacitors to which the wires are connected. Thus current induced in the region between two amplifier connections flows only to the two nearest amplifiers. The fraction of charge flowing to the two adjacent amplifiers is split almost exactly in proportion to the position of the event relative to the amplifiers. In effect, the segment of the line resistors or capacitors between the two amplifiers forms a potentiometer with its two ends grounded by the two amplifiers.

Figure 9:
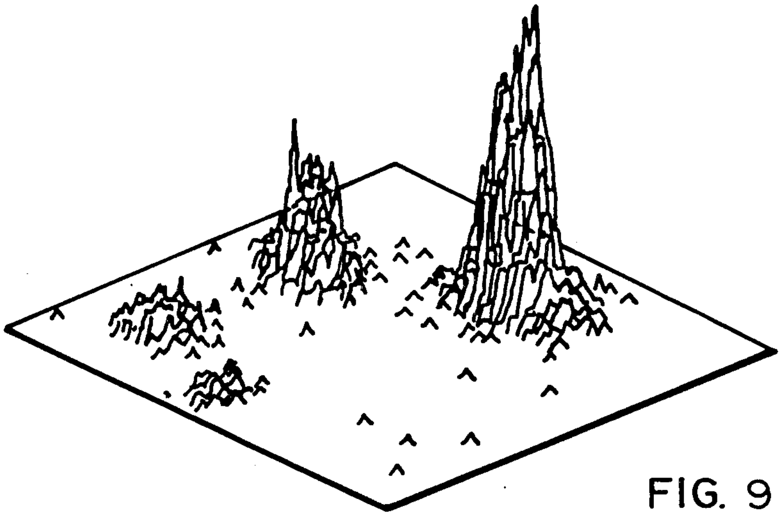
FIG. 9 is a three-dimensional view of a map of a radioactive source, the map having been produced by utilizing the present invention.
Figure 10:
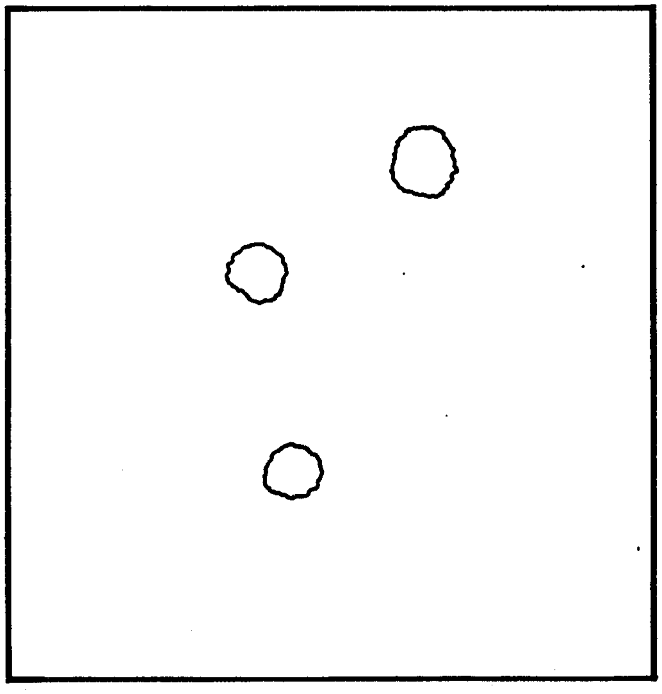
FIG. 10 is a two dimensional representation of the type of map that may be generated using prior art conventional X-ray autoradiography means.

As previously indicated, the main advantage of the present invention in its application to DNA screening results from the significantly reduced time required to map radioactive sources on a test specimen. An example of this advantage may be seen by comparing FIGS. 9 and 10. FIG. 9 represents a three dimensional view of a histogram utilizing data derived from a counter of the present invention. FIG. 10 is a 24 hour autoradiograph utilizing an intensifying screen at −70 degrees Centigrade and conventional X-ray film techniques. The data utilized to derive the three-dimensional view of FIG. 9 took twelve minutes to acquire using the present invention while the time required to develop the X-ray autoradiograph of FIG. 10 was 24 hours. Thus there is a time ratio of approximately 120 to 1. In both cases there were four spots of about 8 millimeters in diameter and the spots were known to have radioactivity corresponding to counts per minute per square millimeter of 15, 5, 1.6 and 0.4, respectively. The counter configuration, utilizing an embodiment of the present invention employed a chamber filled with argon gas (8% organics) and an electrode spacing between anode and cathode of 4 millimeters. As one can readily observe, the data accumulated by the counter of the present invention in a mere 12 minutes, provides a three-dimensional view of all four spots and provides a clear indication of the relative radioactivity of each spot compared to the others. On the other hand, the X-ray autoradiograph of FIG. 10, based on accumulated data over a 24 hour period, provides an observable indication of only three of the four spots and a relatively poor indication, if any, of the difference in radioactivity of the three of the four spots that were in fact detected. Those having skill in the art to which the present invention pertains and particularly to the DNA screening application noted above, will readily appreciate the substantial advantage provided by the present invention as compared to more conventional autoradiograph techniques.

More specifically, it will now be understood that the signal generating portion of the invention comprises an avalanche counter and encoder system for counting and mapping radioactive specimens particularly useful for screening recombinant DNA. A parallel plate counter utilizes avalanche event counting with the ability to locate radioactive sources in two dimensions. The counter has the capacity for simultaneously registering radioactivity over a large area and is useful for a variety of laboratory applications. The counter comprises a thin stretched stainless steel window cathode spaced from a flat anode surface. When a beta ray enters the space between the cathode and anode, an ionization event occurs in a filling gas contained within that chamber. The ionization event results in an avalanche of ionization multiplying the event by almost 100,000,000. The resultant charge rests for a short time on the surface of the cathode and then leaks away. A plurality of electrical pickups using various embodiments of encoder configurations, provides means for processing a current induced by each avalanche event. The encoder system permits calculation and definition of the position of each such event. In one embodiment the coding surface comprises a number of square electrical conducting sheets which are almost contiguous with one another. The avalanche ion current is collected on the anode surface which is a small distance from the coding surface. As a result, an induced signal spreads to several coding elements. The charge is capacitively coupled to several coding elements and the resulting signal distribution is linearly dependent upon the event position from the center of one element to its edge. Other embodiments of the encoding system include a configuration in which each coding square is divided into a series of fine interdigitized fingers which are equal in area and therefore take a direct one-half share of the charge signal to be distributed to a matrix of perpendicular wires arranged in rows and columns and connected to a like plurality of charge sensitive pre-amplifiers. In an additional embodiment, the encoder consists of a structure with many fine wire in perpendicular arrangement with preselected spacings. Each wire is connected to adjacent wires through precision resistors which are in turn connected to amplifiers at selected positions to provide the requisite resolution of detection at a specified signal to noise ratio.

Reference will now be made to FIGS. 12–19 for a discussion of the signal processing and mapping features of the present invention. For purposes of discussion it is assumed that there are a total of 32 lines emanating from the encoder system used, 16 lines for rows and 16 lines for columns, designated X1 through X16 and Y1 through Y16, respectively. However, it will be understood that the number of lines provided by the encoder system of the present invention may be virtually any number depending upon the mapping resolution desired.

Figure 12:
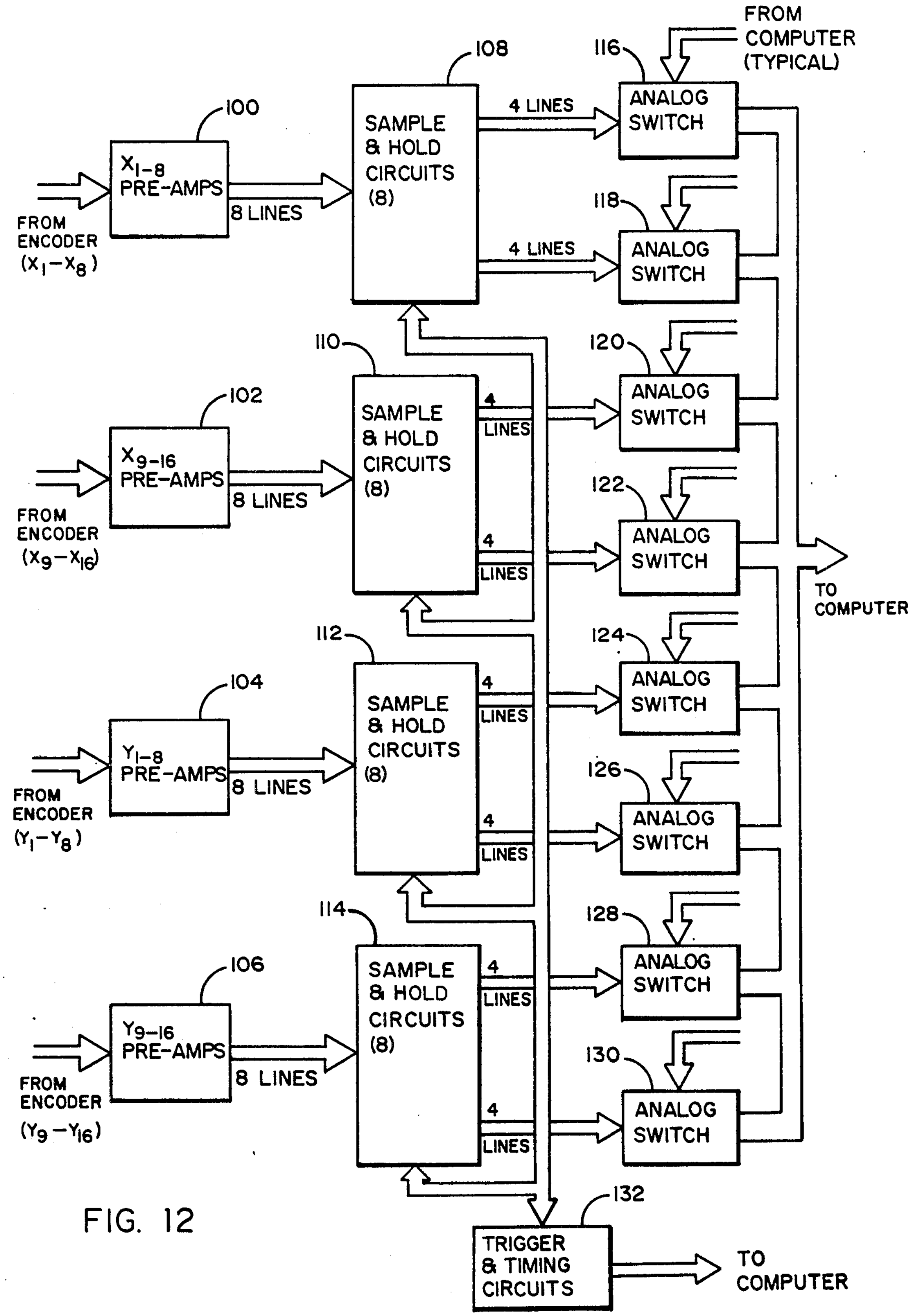
FIG. 12 is a block diagram representation of the signal handling electronics portion of the present invention.

Referring first to FIG. 12 it will be seen that in the disclosed embodiment of the invention the lines from the encoder system are connected to a plurality of pre-amps divided into four groups, 100, 102, 104 and 106, respectively, with the X lines being divided equally into groups 100 and 102 and the Y lines being divided equally into groups 104 and 106. The purpose of the pre-amps is to integrate, amplify and filter, the signal derived from the encoder system for eventual transfer to a computer, the purpose of which will hereinafter be more fully explained. Each of the pre-amp circuit groups 100–106 comprises eight pre-amp circuits of identical configuration. One such pre-amp circuit will be described hereinafter in more detail in conjunction with FIG. 13. As seen further in FIG. 12, the eight output lines of each group of pre-amp circuits 100, 102, 104 and 106 are connected to respective groups of sample and hold circuits 108, 110, 112 and 114. The purpose of the sample and hold circuits is to control the interface between the output signals of the pre-amps and the computer to which the signals are transmitted for further processing. The specific details of a sample and hold circuit will be discussed hereinafter in conjunction with FIG. 14. As seen further in FIG. 12, each group of sample and hold circuits 108–114 is connected to a pair of analog switches, each such analog switch being capable of controlling four lines and thus two such analog switches being provided for each such group. Analog switches are identified in FIG. 12 by reference numerals 116, 118, 120, 122, 124, 126, 128 and 130, respectively. Each such analog switch may by way of example, be one-fourth of a quad-analog switch Model No. LF13331 available from National Semiconductor.

The output lines of all sample and hold circuits from groups 108, 110, 112 and 114 are applied to trigger and timing circuits 132 in the form of a summation signal. In turn, the trigger and timing circuits 132 provide the HOLD signal to the sample and hold circuits which determines the status of the sample and hold circuits insofar as whether those circuits are in their sample or hold modes. Details of the trigger and timing circuits 132 and the hold and sum interface between the trigger and timing circuits and the sample and hold circuits will be discussed more fully hereinafter in conjunction with FIG. 15.

Figure 13:
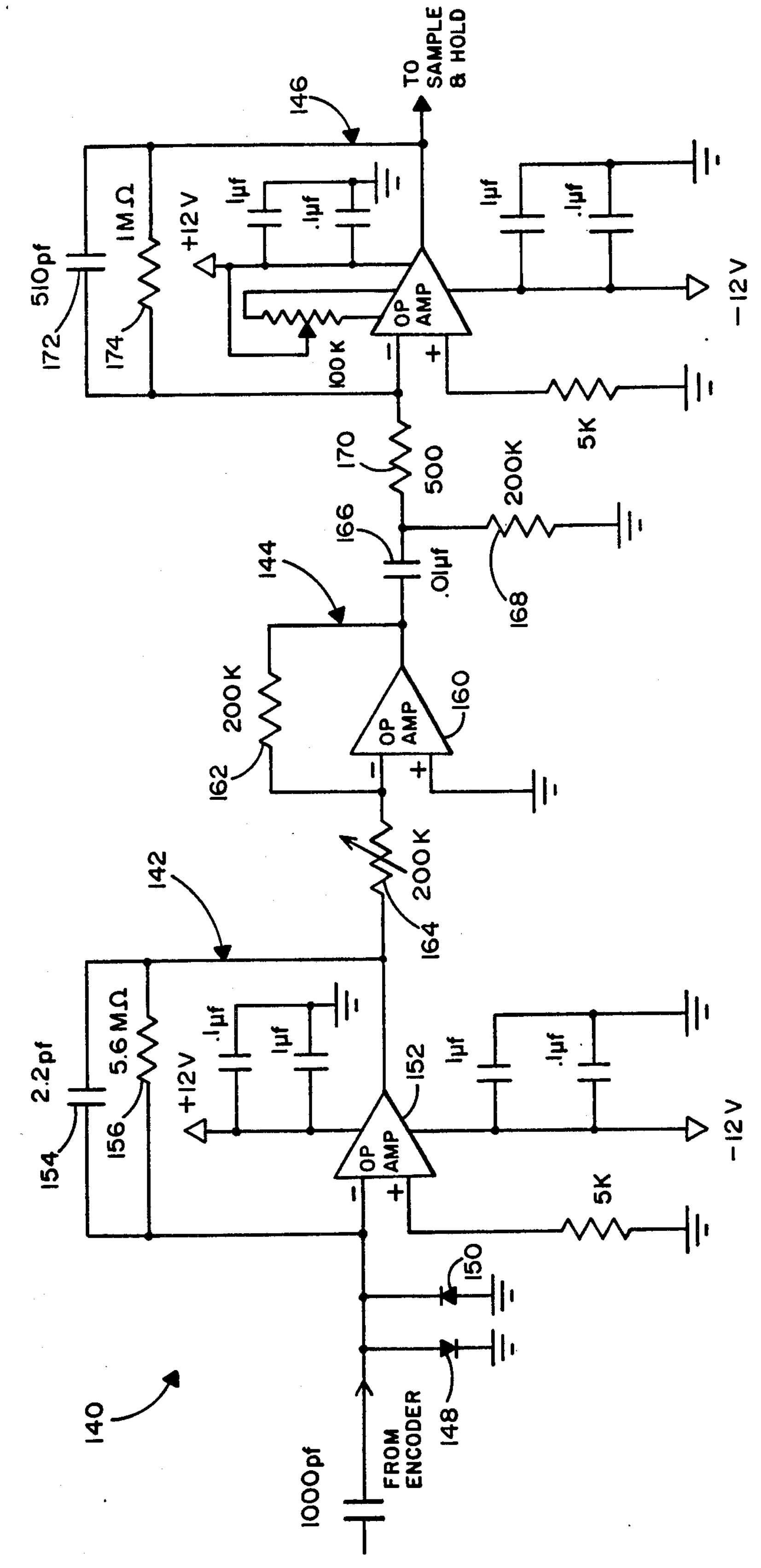
FIG. 13 is a schematic representation of a preamplifier circuit of the signal handling electronics of FIG. 12.

Referring now to FIG. 13 it will be seen that a typical pre-amp circuit 140 is disclosed therein. As previously indicated there are eight such circuits corresponding to each of the eight lines from the encoder in each of the pre-amp groups, 100, 102, 104 and 106 of FIG. 12. Preamplifier circuit 140 comprises three stages, namely, a first stage 142 which is an integrating amplifier, a second stage 144 which is a gain control inverter and a third stage 146 which is a second integrating amplifier. The first stage 142 receives a signal from the encoder and more specifically from a 1,000 picofarad capacitor forming the output of the encoder. A typical encoder signal is in the form of an electric charge pulse having a rise time of approximately 20 microseconds and a decay time of approximately 100 microseconds and having a peak amplitude of approximately 100 millivolts per picocoulomb of charge. However, because of the possibility of spurious static charge signals created by other sources, the input to first stage integrating amplifier 142 is protected by a pair of oppositely facing diodes 148 and 150 (1N914) at the input to operational amplifier 152. Those having skill in the art to which the present invention pertains will observe that the operational amplifier 152 is connected in an integrating amplifier configuration by virtue of the feedback capacitor 154 which in the embodiments disclosed, has a value of 2.2 picofarads. In addition, the feedback circuit of operational amplifier 152 includes a large resistor 156 of value 5.6 megohms in the present embodiment which will be recognized as a means for providing a 12 usec. time constant for the integrator. As seen further in FIG. 13, operational amplifier 152 is connected to +12 and −12 volts DC with suitable filter capacitors connected between ground and the DC voltages. A 5 kilohm resistor in the positive input terminal line prevents leakage current-caused biasing.

The output signal of operational amplifier 152 is connected to second stage 144 comprising operational amplifier 160 which is connected in a simple inverted configuration with a 200 Kilohm feedback resistor 162 and a nominal 200 Kilohm input potentiometer 164. Input potentiometer 164 permits a gain compensation to permit adjustment of the gain through each of the X and Y amplifier channels as required to assure accurate mapping. The output signal of operational amplifier 160 is applied to a DC filter consisting of capacitor 166 and resistor 168. The signal is then applied to the third stage 146 which again will be recognized as an integrating amplifier having a 500 Ohm input resistor 170, a 510 picofarad feedback capacitor 172 and one megohm resistor 174. These components serve the same purpose as feedback resistor 156 previously alluded to in regard to stage 142, namely, to provide a time constant of the integrator, in this case 550 usec. to filter out acoustics. The output of stage 146 is applied to the sample and hold circuit which shall now be discussed in conjunction with FIG. 14.

Figure 14:
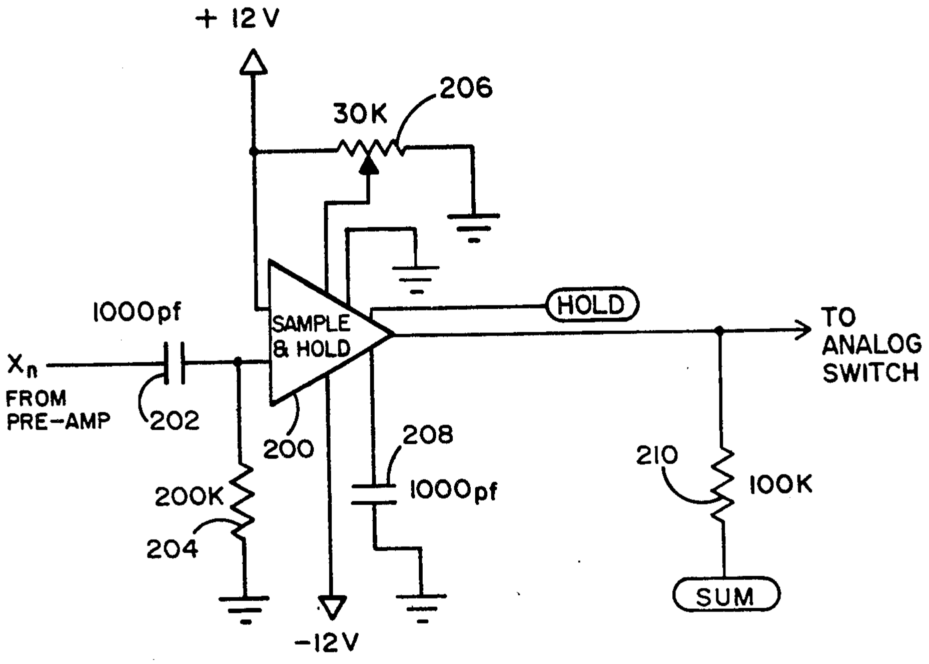
FIG. 14 is a schematic representation of a sample and hold circuit of the signal handling electronics of FIG. 12.

In FIG. 14 it will be seen that the sample and hold circuit comprises a sample and hold integrated circuit such as National Semiconductor Model No. LF398N. The input signals applied through a 1,000 picofarad capacitor 202 and a resistor 204 which is connected to ground. Sample and hold circuit 200 is connected to +12 and −12 volts DC and includes means for a voltage offset adjustment by means of the 30K potentiometer 206. The circuit is connected to a holding capacitor 208 having a value of 1,000 picofarads. The terminal that controls the hold and sample function of the sample and hold circuit 200 is made available for connection to the trigger circuits to be discussed hereinafter in conjunction with FIG. 15 whereby a +5 volt DC signal enables the sampling mode and wherein a 0 volt DC signal enables the hold mode. The output of the sample and hold circuit 200 is connected to an analog switch of analog switches 116 through 130 discussed previously in conjunction with FIG. 12 and is also connected to a summing junction through a 100K Ohm input resistor 210. The output of all sample and hold circuits are summed together at the junction "SUM" and applied to the trigger and timing circuits 132 alluded to previously in conjunction with FIG. 12. The trigger and timing circuits 132 will now be discussed in more detail in conjunction with FIG. 15.

Figure 15:
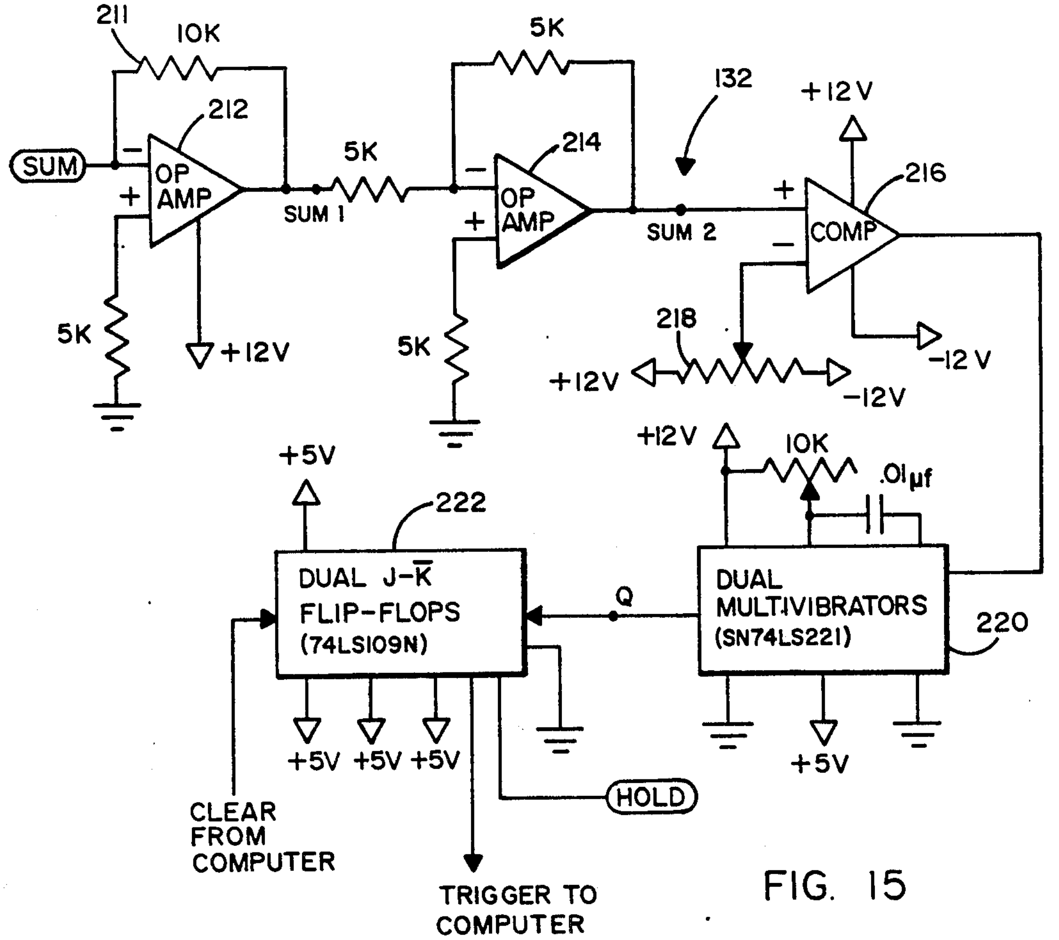
FIG. 15 is a schematic representation of the trigger and timing circuits of the signal handling electronics of FIG. 12.

Referring to FIG. 15 it will be seen that the "SUM" terminal to which all sample and hold output signals are applied forms the input terminal to an operational amplifier 212 and a second inverting operational amplifier 214, the output of which is applied to a comparator 216 as one input thereto. The other input to comparator 216 is derived from a potentiometer 218 connected between the +12 or −12 volt DC supplies. The principal function of trigger and timing circuits 132 is to control the sample and hold circuits and the computer interface between the processing circuits of FIG. 12 and the computer. This control is responsive to the receipt of signals from the coding system indicating that an event has occurred which will provide part of the data base to be used in the mapping function of the present invention. Accordingly, the gain and polarity of signal processing of the "SUM" signal applied to operational amplifier 212 and eventually to comparator 216 is controlled in conjunction with the value of potentiometer 218 to provide an input to multivibrators 220 which responds only when SUM signal has exceeded a predefined threshold set at a level sufficient to assure that a genuine event has occurred and that therefore the sample and hold circuits should all be placed in the hold position until the signals developed by the occurrence of the event can be transferred to the computer for further processing and mapping. The output of the multivibrator circuits 220 is applied to dual flip-flop circuits 222 one output of which is applied to a terminal "HOLD" which is connected to the corresponding "HOLD" terminal of all sample and hold circuits such as that illustrated in FIG. 14. Concurrently, an additional output of flip-flop circuits 222 is a trigger signal which is applied to the computer to alert the computer that the preset threshhold level has been surpassed and that signals available are to be processed by way of analog-to-digital conversion and mapping as will be hereinafter more fully explained.

Figure 16:
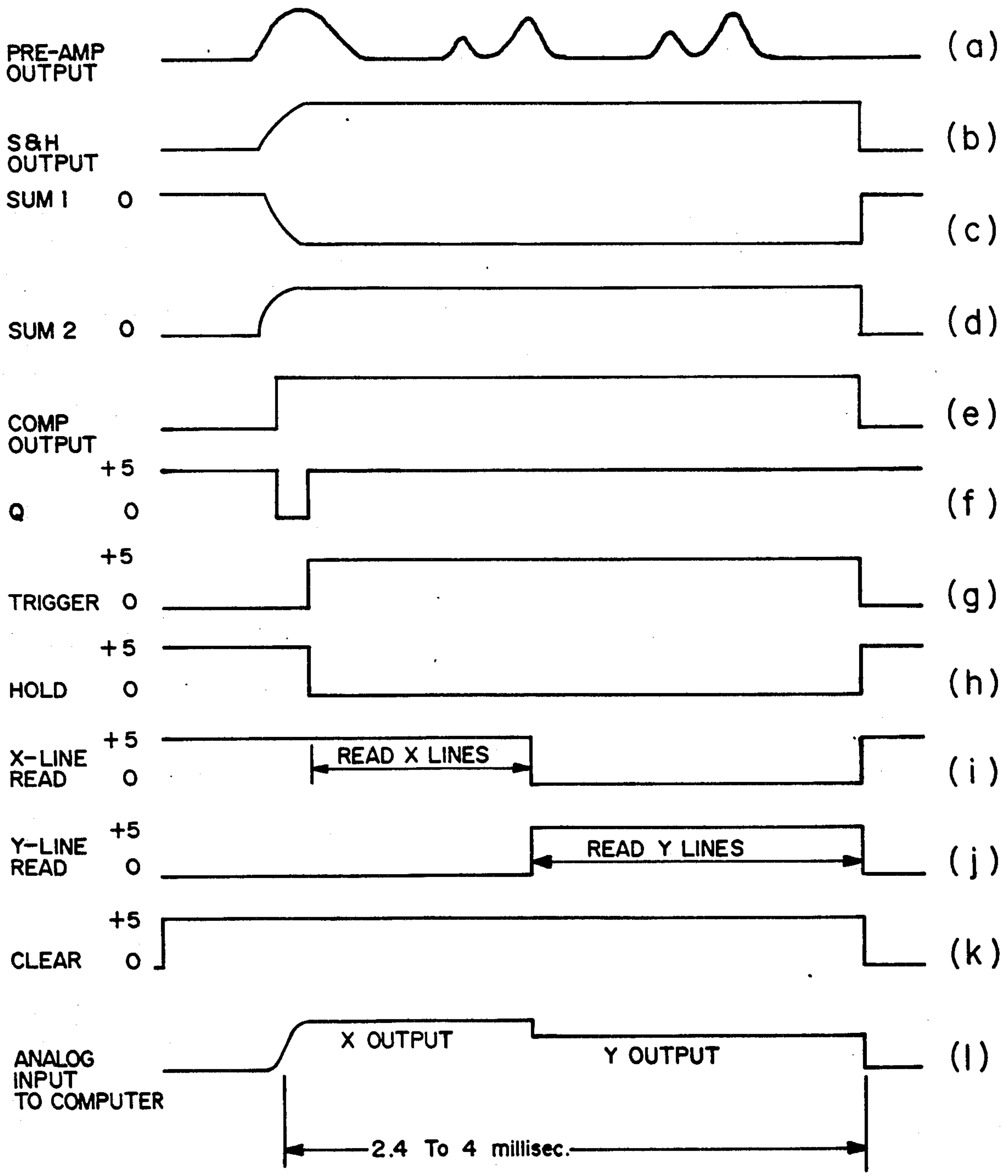
FIG. 16 is a graphical timing diagram of various signals used in the present invention.

The operation of the processing portion of the present invention and particularly the circuits discussed in conjunction with FIGS. 13, 14 and 15 will be further understood as a result of FIG. 16 which is a timing diagram pertaining to various signals utilized in the mapping process. Referring now to FIG. 16 it will be seen that 12 waveforms are illustrated and these are identified by the letters a through l, respectively. Waveform a is illustrative of a typical output signal from the pre-amplifier circuit of FIG. 13. Waveform b is a corresponding output signal from a sample and hold circuit of FIG. 14. Waveforms c and d are signals available at the points identified in FIG. 15 as SUM1 and SUM2, respectively. Waveform e is the corresponding output of the comparator 216 of FIG. 15. Waveform f is the signal at point Q in FIG. 15. Waveform g is the signal in FIG. 15 identified as "trigger to computer". Waveform h is the HOLD signal shown in FIG. 15 and which is applied to the sample and hold circuit of FIG. 14. Waveforms i and j are the X line read and Y line read signals, respectively, that are transmitted by the computer to the analog switches 116 through 130 of FIG. 12. Waveform k is the signal applied to dual flip-flop circuits 222 of FIG. 15 and identified therein as "clear from computer" waveform 1 is an illustrative analog input to the computer on a particular X and Y line channel.

As seen at the bottom of FIG. 16, the total of period of time elapsed between the occurrence of a threshhold exceeding signal at the output of the preamps and the completion of the reading of the X and Y lines, is in the range of 2.4 to 4.0 milliseconds. During this period, which commences when the preamp output which exceeds a signal level corresponding to a SUM2 signal level sufficient to drive the comparator output of waveform e to +5 volts DC, the system ignores subsequent events by means of the sample and hold circuits. More specifically, as seen in FIG. 16, during the processing period noted above, the sample and hold output of waveform b remains substantially constant corresponding to the amplitude of the preamp output at approximately 20 microseconds of rise time for a typical encoder output signal amplitude. Consequently, during this processing period of up to four milliseconds, any new counts that may occur corresponding to additional radioactive events are ignored.

The SUM1 signal is the attenuated equivalent of the SUM signal available at the output of the sample and hold circuit as seen in FIG. 14. The SUM1 signal is attenuated by a factor of approximately 0.1 as seen in FIGS. 14 and 15 wherein the ratio of input resistor 210 to feedback resistor 211 is 0.1. This attenuation assures that operational amplifier 212 of FIG. 15 operates within its limits while providing a signal proportional to the sum of all sample and hold circuit outputs. The SUM2 signal is the inversion of the SUM1 signal which is used to provide a positive input signal to comparator 216. Thus it is seen in FIG. 16 that the SUM2 signal is substantially an inverse of the SUM1 signal. Furthermore, it is seen in FIG. 16 that the comparator output of waveform e switches from 0 to +5 volts when the SUM2 signal is approximately halfway along its rise time curve. In this manner the output of dual multivibrators 220, namely, the Q output represented by waveform f of FIG. 16, can be selected to exhibit a duration sufficient to trigger the computer and hold the sample and hold circuits at substantially the peak of the preamp output.

At the termination of the 2.4 to 4.0 millisecond period, the computer returns a CLEAR signal to flip-flop circuits 222. More specifically, as seen in FIG. 16 waveform k, the CLEAR signal switches from +5 volts to 0 volts DC. As a result, the HOLD signal returns to +5 volts DC thereby freeing the sample and hold circuits to continue to sample the pre-amp output. The SUM signals SUM1 and SUM2 again reflect the sum of the preamp output signals delivered to all of the sample and hold circuits 108, 110, 112 and 114 of FIG. 12. In this manner, the processor of the present invention is reconfigured to accept additional data as additional radioactive events occur and the encoder system transmits additional output signals to the pre-amp circuits of FIG. 13. The multivibrators trigger on an upward signal transition, not on a specific signal level alone. This prevents them from retriggering on the same signal and assures that will trigger on only a new event signal.

Although the present invention has been reduced to practice using a Digital Equipment Corporation MINC PDP/11 computer, it is to be understood that the present invention could be made to operate as required with virtually any common personal, business or scientific computer available today. Because the indicated computer is a commercially available apparatus, it need not be disclosed in any detail herein. However, for purposes of providing a more complete understanding of the present invention the operation of the computer in terms of the program required to carry out the mapping operation from the data generated by the circuits of FIGS. 12–15, will now be discussed hereinafter in conjunction with FIGS. 17a and 17b.

As seen beginning at the upper left-hand corner of FIG. 17a, computer operation software may be characterized in the following manner: The program cycles through the event trigger decision function until a trigger signal is sent by the trigger and timing circuits 132 of FIG. 12. More specifically, this function "looks" for the trigger signal of the dual flip-flop circuit 222 of FIG. 15 as previously discussed. When an event trigger occurs the program selects the X lines as an input and converts all the X lines from analog to digital using analog-to-digital converters within the computer. In the particular example illustrated in the flow chart of FIGS. 17a and 17b, it is assumed that there are 12 X lines and 12 Y lines. After the X lines are converted to digital, the Y lines are selected as an input and they too are converted to digital. The computer then compensates in digital format for gain mismatches that may exist between the respective channels of the X and Y lines using preselected constants programmed by the user depending upon gain mismatches that may exist in the processing portion of the electronics. The program next sums the X lines and the Y lines and divides the two sums to determine whether the quotient is approximately one. If the quotient is not approximately one, the data is suspect and a flag is set which will later in the program preclude histogram mapping of the event. On the other hand, if the data is not suspect, that is, if the quotient of the division of the sum of all X lines by the sum of all Y lines is approximately equal to one, then the data is potentially reliable and the program continues the mapping process.

The next step in this mapping process is finding the highest amplitude X line which is designated NX1 for purposes of our explanation. The program next finds the second highest X line designated NX2. The program then determines whether the highest and next highest X lines are adjacent lines or neighbors. If they are not, the data is again suspect and a flag is set. If they are adjacent X lines the program then goes on to find the highest and second highest Y lines NY1 and NY2, respectively and determines whether these are in fact neighbors. If they are not neighbors, again the data is potentially unreliable and a flag is set. If they are neighbors the program then proceeds to map the event based on the values of the highest and next highest X and Y lines, respectively.

Once the highest X-line (NX1) and the highest Y-line (NY1) have been found, the event is localized to within one element on the encoder. The center of this element is found by assuming that location in the counter ranges on a scale from −0.5 to +0.5. On this scale the center of an element maps as:

$$-.5 + 1/24 + \frac{NX1 - 1}{12}, \; -.5 + 1/24 + \frac{NY1 - 1}{12}$$

assuming that the encoder array comprises 12 by 12 elements. Then by using the value $$Xt = \frac{VAL\ (NX1) - VAL\ (NX2)}{VAL\ (NX1) + VAL\ (NX2)}$$

where VAL (NX1)=signal on line NX1 and the value Yt derived in the same manner from NY1 and NY2, and the mapping function of the program (see Appendix I), the fraction of the distance from the center of the localized element to the edge of the localized element is obtained.

The mapping function is empirically derived for a particular counter configuration and will change if the anode thickness is changed or if the encoder pattern changes. If f(Xt=0)=1, that corresponds to VAL (NX1)=VAL(NX2) and the event has occurred precisely between two adjacent elements. The variation in mapping function value corresponds to a variation of $\frac{1}{2}$ of an element dimension and equals 1/24 on the scale noted above. Whether the distance is to the left or right of the element center is determined by the position of the neighbor (second highest) line. Hence $$\text{position} = -.5 + 1/24 + \frac{NX1 - 1}{12} + \frac{XSGN * f(Xt)}{24} = P.$$

The mapping function is capable of truncation by selection of the scale of resolution of 100 lines of counter display (g). If g=100 the entire counter surface area is displayed. If g=200 only one-fourth of the counter surface area is displayed. As small a region of the counter surface area as desired may be displayed. The line is calculated by g*p which will be in the range −g/2 to g/2. Center XMW1 is shifted to display center by the following: g*(P+(6.5−XMW1)/12) and the specific 100 lines displayed and histogrammed are determined by 50+g*(P+6.5−XMW1/12).

After the event is mapped, the program then checks for any flag settings. If a flag has been set indicating that the data received is unreliable for one of several reasons previously noted, the program jumps to the keyboard command check, skipping the histogram process. If no flag has been set the program then determines whether the event that has been mapped has occurred within the chosen 100×100 line counter display selected at the start of the program. If it has not been, then again the histogram process is skipped and the program jumps to the keyboard command check. However, if the event that has been mapped is within the chosen 100×100 line counter display, the event is histogrammed in the 100×100 array as indicated in FIG. 17*a*. The program then continues as indicated at the topmost portion of FIG. 17*b* where the next step in the program is to display the event on the screen of the display. The program then checks for keyboard commands. There are eight such commands. One such command stores the present 100×100 array in memory such as a disk. Another keyboard command updates the video display. Another clears the screen display zeroing the 100×100 array and starts the count over. Another command allows the user to enter new color functions. Another clears the display and allows the user to enter new values for g, the color functions, the center of the array and so forth. Still another prints time, values of entered variables, the number of events and allows the user to select a function which will dump the display into a printer. Still another allows the user to change the coordinates of the center of the array. The last keyboard command allows the user to change the number of lines in the array, that is, the value g. All of these keyboard commands are checked as shown in FIG. 17*b* which illustrates only two for purposes of brevity. Finally, the computer ascertains that there are no further keyboard options selected and returns to the event trigger decision box in the upper portion of FIG. 17*a*.

Figure 17A:
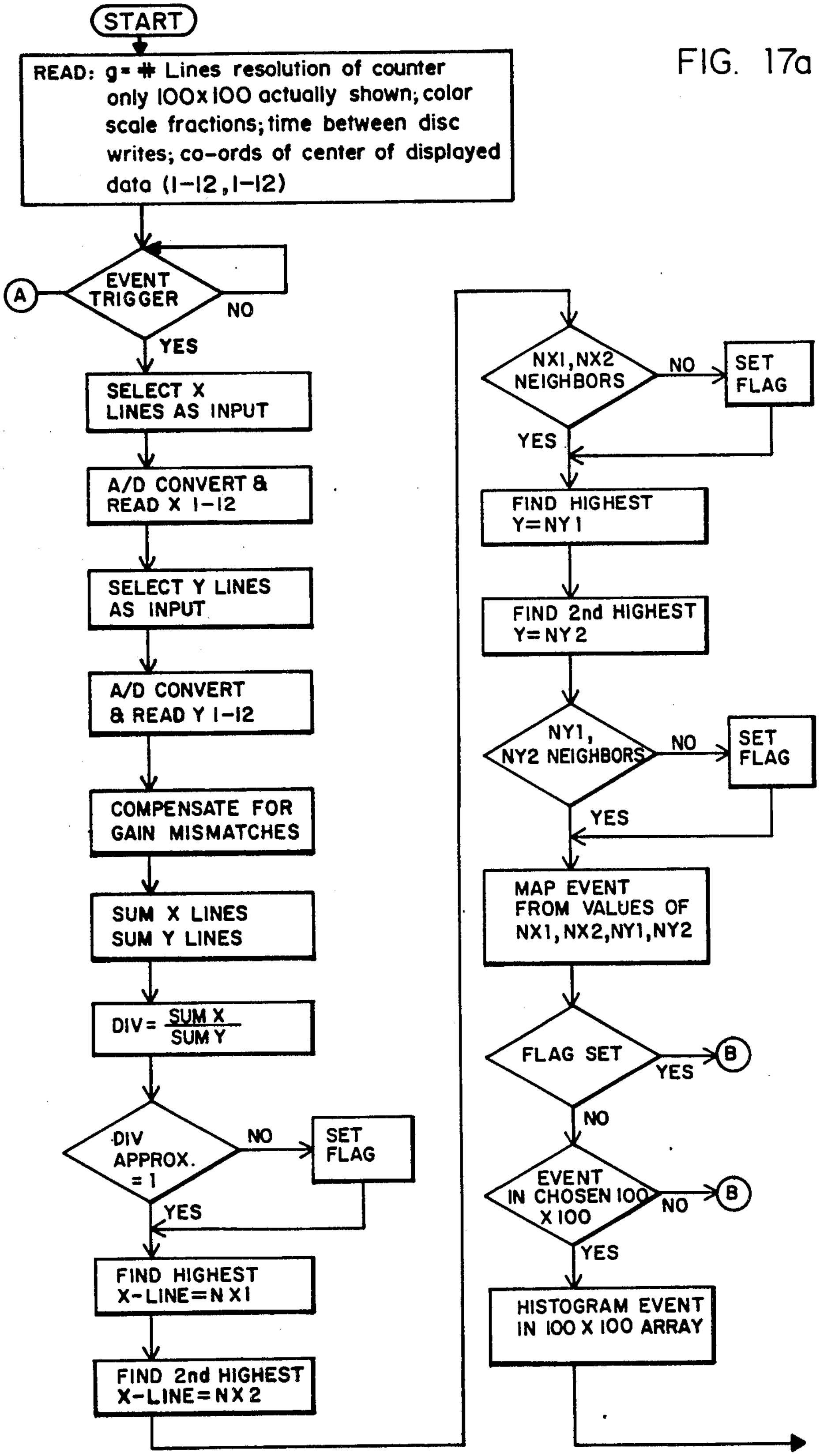

A listing of the program corresponding to the flow chart of FIGS. 17*a* and 17*b* is attached hereto as Appendix I to enable those having skill in the art to which the present invention pertains to make and use the invention and to more fully understand the manner in which the mapping program of the invention is carried out. The program of Appendix I and FIGS. 17*a* and 17*b* may be summarized as a program to receive signals, store them in a buffer, convert the set of signal amplitudes to position information and store the events at each location in a 100×100 array kept in a disk file and updated every few minutes.

Also included herein as Appendix II are the listings of a set of programs designed to further process the disk file data in the following manner. A program called TRANSMIT transmits the data from the MINC PDP/II computer serially through an RS232 port to a second computer (an Apple II+) which in the present embodiment of the invention was used primarily for purposes of convenience. This second computer is programmed to receive and file the data by means of a program called RECEIVE which is included in Appendix II in assembly language. An additional program written in basic language and called PYR1 enhances the data by removing inadvertent spread due to the beta ray geometry and the thermal noise in the amplifiers. Program PYR1 creates a disk file of enhanced data. The remaining programs in Appendix II work together to prepare the data for printing to create an image showing the intensity and location of the radioactive events by means of a gray scale image. The result is shown in FIGS. 18 and 19. More specifically, in the particular example illustrated in FIGS. 18 and 19, two radioactive point sources were placed one millimeter apart and the position of individual events was calculated and stored in the array. The data shown in FIGS. 18 and 19 were corrected for the expected spread of reordered positions due to the natural diversion of the beta rays from the sources as well as the resolution errors and thermal noise in the amplifiers. The corrected solution is shown in FIG. 18 as an array. The data is the actual solution without any background subtraction. The image of FIG. 19 is the product of the additional software (GREYRESULT, NEWGREY and RANUM) which creates a "gray scale" proportional to the number in each array point. The spacing between two array points is 0.11 millimeters. The two spots are completely resolved and a few percent of the counts appear in intermediate regions. The relative number of counts in the corrected array reflects accurately the relative intensities of the two sources. It is possible to correct the displayed data in the present invention to yield a sharper image than can be obtained with film.

It will be understood that the present invention provides a novel radioactive event mapping system for locating and mapping radioactive sources over a large area with resolution especially useful for DNA screening and replication. A counter provides the ability to accurately locate a radioactive event detected by the counter whereby to enable mapping of such events that occur over a selected period of time. The counter is combined with an encoder for locating these radioactive sources in two dimensions with high resolutions over a large area. A processing system comprising a plurality of pre-amplifier channels, sample and hold circuits, analog switches, timing and trigger circuits and a specially programmed computer, convert encoder signals into displayed and stored data that are enhanced to provide a grey-scale image of the radioactive sources. Those having skill in the art to which the present invention pertains will now perceive of various alternative embodiments as well as modifications and additions to those disclosed herein. However, each such alternative embodiment, modification and addition based on the applicants' teaching herein, is deemed to be within the scope of the invention which is to be limited only by the claims appended hereto.

APPENDIX I

MAPPING PROGRAM

```
.TY PURE.FOR
carrays for  levels in printout
          program pure
          implicit integer(q)
          byte ichar,char
          real Ksum,nu,mm,m
          integer*4 Jt
          dimension qnp(100,100),Jou(20)
          dimension idata(24),pdata(24),weight(24)
          common qnp
          data weight/1.033,1.153,1.068,1.152,1.103,1.114,
        c 1.230,1.028,1.150,1.040,1.051,.970,
        c 1.067,1.023,1.0,1.017,1.062,1.017,
        c 1.118,1.291,1.128,1.163,1.141,1.179/
99        do 2 J=1,100
          do 2 K=1,100
2         qnp(j,k)=0
          type 19
19        format($,x,'scale factor (unity=100?)')
          read (5,*)s
          type 37
37        format($,x,'color fractions: in,mid,out;>=<1!')
          read (5,*)zin,zmid,zout
          in=zin
          mid=zmid
          iout=zout
          type 41,in,mid,iout
41        format(x,3i7)
          type 39
39        format($,x,'time in minutes between disk writes: ')
          read(5,*) zmin
c         type 3010
3010      format($,x,'xh,yh ')
c         read(5,*)xh,yh
          type 3011
3011      format($,x,' center cx cy ')
          read(5,*)xmw1,ymw2
c         type 3022
3022      format($,x,'high,low(signal sum) ')
c         read(5,*)shigh,slow
          ztst=zmin
          lc=0
          JJ=0
1125      write(7,1) 27,27,27                    !enter graphics
1         format(x,$,a1,'[?0i'a1'[2J'a1'Pps(e)')
          type 15,3
15        format($,x'W(M'i3')')                  !pixel vector=3
          write(7,3)
3         format($,x'W(r)')                      !replace type screen writing
          Jsw=ipeek("44)                         !set up cmd stuff
          Jsw=Jsw.or."50100
          call ipoke("44,Jsw)
8         Ksum=0
          cvent=0
          mm=0
          zmax=5.0
          m=0
          call gtim(Jt)
          call cvttim(Jt,Kh,Km,Ks,Kt)
          total=0
          goto 10
```

```
16      write(7,1) 27,27,27                       !enter graphics
10      call sub122(idata)             ! read 24 value
        Kflag=0
        event=event+1
        do 1140 Ki=1,24
        idata(Ki)=idata(Ki)-2048
1140    if(idata(Ki).ge.2000.or.idata(Ki).le.20)Kflag=1
        sumx=0
        sumy=0
        do 110 i=1,12
        pdata(i)=weight(i)*float(idata(i))
        pdata(i+12)=weight(i+12)*float(idata(i+12))
        sumx=sumx+pdata(i)
110     sumy=sumy+pdata(i+12)
        div=sumx/(sumy+.0001)
        if(div.lt.(.9).or.div.gt.(1.1))Kflag=1
        nx1=1
        nx2=2
        ny1=13
        ny2=14
        do 100 i=1,12
        if(pdata(i).gt.pdata(nx2))nx2=i
        if(pdata(i).lt.pdata(nx1))goto 115
        nx2=nx1
        nx1=i
115     if(pdata(i+12).gt.pdata(ny2))ny2=i+12
        if(pdata(i+12).lt.pdata(ny1))goto 100
        ny2=ny1
        ny1=i+12
100     continue
        nxsgn=nx2-nx1
        if(iabs(nxsgn).gt.1.or.nxsgn.eq.0)Kflag=1
        xsgn=float(nxsgn)
        nysgn=ny2-ny1
        if(iabs(nysgn).gt.1.or.nysgn.eq.0)Kflag=1
        ysgn=float(nysgn)
        if(Kflag.eq.1)goto 357
        xt=(pdata(nx1)-pdata(nx2))/(pdata(nx1)+pdata(nx2)
        yt=(pdata(ny1)-pdata(ny2))/(pdata(ny1)+pdata(ny2)
c       aaa=-1.49111*xt**3-.081586*xt**2-1.175212*xt+1     !xh=.58
c       bbb=-1.49111*yt**3-.081586*yt**2-1.175212*yt+1     !yh=.58
c       aaa=-2.243037*xt**3+.363208*xt**2-1.23265*xt+1     !xh=.57
c       bbb=-2.243037*yt**3+.363208*yt**2-1.23265*yt+1     !yh=.57
        aaa=-3.130485*xt**3+.884933*xt**2-1.299557*xt+1    !xh=.56
        bbb=-3.130485*yt**3+.884933*yt**2-1.299557*yt+1    !yh=.56
357     if(aaa.gt.1.001)Kflag=1
        if(bbb.gt.1.001)Kflag=1
        aa=xsgn*aaa/24.0
        bb=ysgn*bbb/24.0
        aa=aa+float(nx1)/12.0-.5-1.0/24.0
        bb=bb+float(ny1-12)/12.0-.5-1.0/24.0
102     Ksum=Ksum+1
        if(Kflag.eq.1)Ksum=Ksum-1
        x=aa+13.0/24.0-xmw1/12.0
        xx=x*g
        y=bb+13.0/24.0-ymw2/12.0
        yy=y*g
        jx=xx+50
        jy=yy+50
        if(jx.lt.1)jx=1
        if(jy.lt.1)jy=1
        if(jx.gt.100)jx=100
        if(jy.gt.100)jy=100
        if(Kflag.eq.1)jx=1
        if(Kflag.eq.1)jy=1
        qnp(jx,jy)=qnp(jx,jy)+1
        ix=jx*4
        iy=jy*4
        if(zin.ge.1)goto 444
        z=float(qnp(jx,jy))
        if(jx.lt.10.or.jx.gt.90)goto 666
        if(jy.lt.10.or.jy.gt.90)goto 666
        if(z.gt.zmax)zmax=z
```

```
666     if(z.lt.zmax*zout)goto 300
        kb=3
        if(z.lt.zmax*zin)kb=2
        if(z.lt.zmax*zmid)kb=1
        goto 446
444     it=gnp(jx,jy)
        if(it.lt.iout)goto 300
        kb=3
        if(it.lt.mid)kb=1
        if(it.lt.in)kb=2
446     type 17,kb
17      format($,x'W(1'i3')')        !screen intensity
        write(7,151) ix,iy,0,6,4     !4x4 on screen using pixel vector
151     format($,x,'p['i3','i3']v[] v'3i3)
358     call gtim(jt)
        call cvttim(jt,nh,nm,ns,nt)
        ttt=60.0*float(nh-kh)+float(nm-km)+float(ns-ks)/60.0
        if(ttt.lt.ztst) go to 300
        ztst=ztst+zmin
225     call wrdisk
300     ich=ittinr()                         !check keyboard
        if (ich.lt.0)   goto 10
        ichar=ich
        if(ichar.ne.'s')goto 220
        goto 225
220     if(ichar.ne.'q')goto 800
        type 1001
        do 400 jj=1,100
        ix=jj*4
        do 400 kk=1,100
        iy=kk*4
        if(in.ge.1)goto 448
        z=float(gnp(jj,kk))
        if(z.lt.zmax*zout)goto 400
        kb=3
        if(z.lt.zmax*zin)kb=2
        if(z.lt.zmax*zmid)kb=1
        goto 450
448     it=gnp(jj,kk)
        if(it.lt.iout)goto 400
        kb=3
        if(it.lt.mid)kb=1
        if(it.lt.in)kb=2
450     type 17,kb
        write(7,151) ix,iy,0,6,4                 !4x4 on screen
400     continue
800     if(ichar.ne.'c') go to 1000
        write(7,1001)
1001    format($,x,'s(e)')
        do 600 i=1,100
        do 600 j=1,100
600     gnp(i,j)=0
        go to 8
1000    if(ichar.ne.'b')goto 1200
        read(5,*)zin,zmid,zout
        in=zin
        mid=zmid
        iout=zout
        goto 10
1200    if(ichar.ne.'r')go to 1300
        write(7,1003)27
1003    format(x,'s(e)'a1'\')
        go to 99
1300    if(ichar.ne.'p')go to 1310
2200    write(7,73)27
        write(7,75)27,27
73      format($,x,a1'\')                  !exit regis
75      format($,x,a1,'[5i'a1'[6i')        !print only
77      format(x,21i5)
79      format(x,21f5.0)
81      format($,x,a1'[','4','w')          !16.5 cpi
83      format($,x,a1'[','1','w')          !10 cpi
        type 81,27
```

```
        call stim(jt)
        call cvttim(jt,jh,jm,js,jk)
        tmin=(jh-kh)*60.0+jm-km+(js-ks)/60.0
        type 67,tmin
        type 66,jh,jm,kh,km
67      format(x,'elaps min='f9.2,' (overnite:+1440 per midnite')
66      format(x,'now= 'i2':'i2' start= 'i2':'i2)
        type 87,s,ksum,event
87      format(x,' expansion='f7.0'counts= '3f9.0)
        type 63,zin,zmid,zout,zmax
63      format(x,'bounds: in mid out & current max:'3f7.4,f7.1)
873     format(x,'type 1 start over,2 continue,3 graph,4array')
880     type 81,27                          !print size
        type 873
        read(5,*)sw
        goto(99,918,700,900),sw
918     type 89,27,27                       !turn on screen
        goto 18
89      format($,x,a1,'[4i'a1'[7i')
700     type 85,27                          !enter regis, set hard copy
85      format($,x,a1'Pps(h)')
        goto 10
900     type 73                             !exit regis
        type 75                             !print only
        type 81                             !16.5 cpi
        type 901
901     format(x,'x where to start, y where to start?')
        read(5,*)mx,my
        type 931,mx,my
        do 920 j=my,my+19
        do 910 k=1,20
910     jou(k)=gnp(k-1+mx,j)
920     type 931,jou
931     format(x,20i5)
        goto 700
1310    if(ichar.ne.'m')goto 1320
        read(5,*)xh,yh
        goto 10
1320    if(ichar.ne.'l')goto 1330
        read(5,*)xmw1,ymw2
        goto 10
1330    if(ichar.ne.'s')goto 10
        read(5,*)s
        goto 10
        end
.TY SUB122.MAC
        .title  sub122
        .globl  sub122
adsr:   .word   171000
adbr:   .word   171002
n:      .word
sub122: tst     (r5)+
        mov     (r5),r1
        mov     #1,171776
        mov     #171000,r3
        mov     #171002,r4
        mov     #1020,(r3)
        mov     #5,171776
x2:     tstb    (r3)
        bpl     x2
        mov     (r4),(r1)+
        mov     #1401,(r3)
x3:     tstb    (r3)
        bpl     x3
        mov     (r4),(r1)+
        mov     #2001,(r3)
x4:     tstb    (r3)
        bpl     x4
        mov     (r4),(r1)+
        mov     #2401,(r3)
x5:     tstb    (r3)
        bpl     x5
        mov     (r4),(r1)+
        mov     #3001,(r3)
x13:    tstb    (r3)
        bpl     x13
        mov     (r4),(r1)+
        mov     #6,171776
        mov     #1001,(r3)
y2:     tstb    (r3)
        bpl     y2
        mov     (r4),(r1)+
        mov     #1401,(r3)
y3:     tstb    (r3)
        bpl     y3
        mov     (r4),(r1)+
        mov     #2001,(r3)
y4:     tstb    (r3)
        bpl     y4
        mov     (r4),(r1)+
        mov     #2401,(r3)
y5:     tstb    (r3)
        bpl     y5
        mov     (r4),(r1)+
        mov     #3001,(r3)
y6:     tstb    (r3)
        bpl     y6
        mov     (r4),(r1)+
        mov     #3401,(r3)
y7:     tstb    (r3)
        bpl     y7
        mov     (r4),(r1)+
```

```
x6:     tstb    (r3)
        bpl     x6
        mov     (r4),(r1)+
        mov     #3401,(r3)
x7:     tstb    (r3)
        bpl     x7
        mov     (r4),(r1)+
        mov     #4001,(r3)
x8:     tstb    (r3)
        bpl     x8
        mov     (r4),(r1)+
        mov     #4401,(r3)
x9:     tstb    (r3)
        bpl     x9
        mov     (r4),(r1)+
        mov     #5001,(r3)
x10:    tstb    (r3)
        bpl     x10
        mov     (r4),(r1)+
        mov     #5401,(r3)
x11:    tstb    (r3)
        bpl     x11
        mov     (r4),(r1)+
        mov     #6001,(r3)
x12:    tstb    (r3)
        bpl     x12
        mov     (r4),(r1)+
        mov     #6401,(r3)
        mov     #4001,(r3)
y8:     tstb    (r3)
        bpl     y8
        mov     (r4),(r1)+
        mov     #4401,(r3)
y9:     tstb    (r3)
        bpl     y9
        mov     (r4),(r1)+
        mov     #5001,(r3)
y10:    tstb    (r3)
        bpl     y10
        mov     (r4),(r1)+
        mov     #5401,(r3)
y11:    tstb    (r3)
        bpl     y11
        mov     (r4),(r1)+
        mov     #6001,(r3)
y12:    tstb    (r3)
        bpl     y12
        mov     (r4),(r1)+
        mov     #6401,(r3)
y13:    tstb    (r3)
        bpl     y13
        mov     (r4),(r1)+
        mov     #1,171776
        rts     pc
        .end
```

```
.TY WRDISK.FOR
        SUBROUTINE WRDISK
        REAL*8 FSPEC
        INTEGER*2 GNP(100,100)
        COMMON GNP
C
C
        CALL IRAD50(12,'DK COUNTSDAT',FSPEC)     !CONVERT FILE NAME
        ICHAN=IGETC()                            !GET I/O CHANNEL
        NWRDS=100*100
        IF(ICHAN.LT.O) STOP 'CANNOT ALLOCATE CHANNEL'
        IF(IFETCH(FSPEC).NE.O) STOP 'FATAL FECTCHING ERROR'
        IF(LOOKUP(ICHAN,FSPEC).GE.O) GO TO 100
C  NO DATA FILE ON DK: SO CREATE ONE
C
        NBLKS=(NWRDS+255)/256
        IF(IENTER(ICHAN,FSPEC,NBLKS).LT.O) STOP 'ENTER FAILURE'
100     IBLK=0                                   !START WRITING AT FIRST
C                                                 BLOCK OF FILE
        IER=IWRITW(NWRDS,GNP,IBLK,ICHAN)
        IF(IER.LT.O) STOP 'WRITING ERROR'
        IER=CLOSEC(ICHAN)                        !CLOSE FILE
        IF(IER.NE.O) STOP 'CLOSE ERROR'
        CALL IFREEC(ICHAN)                       !FREE CHANNEL
        RETURN
        END
```

APPENDIX II

TRANSMIT PROGRAM

```
TY SAPPLE.FOR
        implicit integer(g)
        dimension gnp(100,100)
        common gnp
        call rddisk
        max=0
        do 100 i=2,99
        do 100 j=2,99
100     if(gnp(i,j).gt.max)max=gnp(i,j)
        type 150,max
150     format(x,'max='i8)
        f=255/float(max)
        do 200 i=1,100
        do 200 j=1,100
        d=float(gnp(i,j))
        b=d*f
200     gnp(i,j)=ifix(b)
        call sendat(gnp)
        end
```

```
.TY SENDAT.MAC
        .title  sendat
        .globl  sendat
```

```
sendat: tst     (r5)+
        mov     (r5),r1
        mov     #23420,r2
loop1:  mov     176520,r3
        bit     #200,r3
        beq     loop1
loop2:  bit     #200,176524
        beq     loop2
        mov     (r1)+,r3
        cmp     r3,#377
        ble     send
        mov     #377,r3
send:   mov     r3,176526
        dec     r2
        bne     loop1
        rts     pc
        .end
```

RECEIVE PROGRAM

```
DATA      EQU  $COCF        ;UART
STATUS    EQU  $COCE        ;CHAR?
ANCHORO   EQU  $1E          ;=30
*
          ORG  $6800        ;=26624
*
*INIT FIRST STORES $03 IN UART
*STATUS TO RESET IT AND THEN
*STORES $15 TO SET IT TO 300 BAUD
*8 DATA BITS, 1 STOP BIT
INIT      LDA  #$00         ;ZERO
          STA  ANCHORO
          STA  OFFSET
          LDA  #$40
          STA  ANCHORO+1
          LDA  #$03         ;SET URT
          STA  STATUS
          LDA  #$15
          STA  STATUS
          LDA  DATA
GETDATA   LDA  #13          ;CHR RET
          JSR  SENDONE
*WE HAVE NOW SENT A STRING TO
*THE MINC AND ARE READY TO GET
*10K BYTES OF DATA AND STORE
*USING PG 0 INDIRECTION FROM $1E-
*$1F BEGINNING AT $6700
*
*
DATAIN    JSR  GETONE
          JSR  SENDONE
*$8E IS THE TOP PAGE OF MEMORY
*FOR THE 10K BYTES. IT IS 9984
*BYTES. ADD THE 16 OFFSET FROM
*THE OFFSET VARIABLE AND =10K
*
D1        LDY  ANCHORO+1
          CPY  #$67         ;END ARY
          BCC  D2
          LDY  OFFSET
          CPY  #16
*16 BYTES + 39 PAGES IS 10K BYTES
          BCC  D2
          JMP  $FF69
D2        LDY  OFFSET
          STA  (ANCHORO),Y
          INY
          BNE  D3
          INC  ANCHORO+1
          LDA  ANCHORO+1
          JSR  $FDDA
          JSR  $FD8E
          LDY  #0
```

```
D3         STY   OFFSET
           JMP   DATAIN
*
SENDONE    TAY
C5         LDA   STATUS
* 02 IS TRANS BUFFER  EMPTY
           AND   #2
           BEQ   C5
           TYA
           STA   DATA
           RTS
*SENDONE CHECKS STATUS TO MAKE
*SURE TRANS BUFFER EMPTY AND PUTS
*NEXT CHAR INTO BUFFER WHEN IT IS
*
GETONE     LDA   STATUS
           AND   #1
           BEQ   GETONE
*01 IS RECEIVED CHAR READY
           LDA   DATA
           RTS
OFFSET     DFB   #0
```

PYR1 PROGRAM

```
20  PRINT  CHR$ (27); CHR$ (101);
    CHR$ (0); CHR$ (4): REM  10
    1 IS LOWER CASE E
22  PRINT  CHR$ (9); CHR$ (1)
24 H$ =  CHR$ (9)
30  INPUT "HOW FAR DOWN?";BB
50  DIM C(20,30)
60  DIM RE(20,30)
100 D$ = "": REM  THERE IS A CNTR
    LD THERE
110  PRINT D$;"PR#1"
200  PRINT D$"OPEN CPM"
300  PRINT D$"READ CPM"
400  FOR Y = 1 TO 30
500  FOR X = 1 TO 20
600  INPUT C(X,Y)
700  NEXT X
720  NEXT Y
750  DIM SQ(8)
800  DIM S(7,7)
850 Q = 256
900  FOR A = 0 TO 7
920 SQ(A) = Q - 1
930 Q = Q / 2
940 R = Q
950  FOR B = 0 TO 7
1000 S(A,B) =  INT (R)
1100 R = R / 2
1200  NEXT
1300  NEXT
1400 CC = 0
1500 CC = CC + 1
1550 M = 0
1600  FOR Y = 1 TO 30
1700  FOR X = 1 TO 20
1800  IF C(X,Y) < M GOTO 2000
1820 M = C(X,Y)
1840 MX = X
1850 MY = Y
2000  NEXT
2100  NEXT
2130  PRINT MX,MY,CC
2133  PRINT M,C(MX,MY)
2180 B = 0
2200  FOR A = 0 TO 7
2300  IF M > S(A,B) GOTO 2400
2350  NEXT
2400 B = A
2500  FOR AY = 1 TO 15
2600 Y = MY + AY - 8
2620  IF Y < 1 GOTO 2800
2630  IF Y > 30 GOTO 2800
2640 DY =  ABS (AY - 8)
2650  FOR AX = 1 TO 15
2670 X = MX + AX - 8
2690  IF X < 1 GOTO 2790
2700  IF X > 20 GOTO 2790
2720 DX =  ABS (AX - 8)
2730 Z = DX
2740  IF DY > DX THEN Z = DY
2750 C(X,Y) = C(X,Y) - S(Z,B)
2790  NEXT
2800  NEXT
3100 RE(MX,MY) = RE(MX,MY) + SQ(B
    )
3130  PRINT B,BB
3150  PRINT C(MX,MY),RE(MX,MY)
3155  PRINT
3160  IF B = BB GOTO 3420
3200  GOTO 1500
3420  FOR Y = 1 TO 30
3430  FOR X = 1 TO 20
3440  PRINT C(X,Y);H$;
3450  NEXT
3460  PRINT
3470  NEXT
3510  FOR Y = 1 TO 30
3520  FOR X = 1 TO 20
3530  PRINT RE(X,Y);H$;
3540  NEXT
3550  PRINT
3560  NEXT
3990  PRINT D$;"PR#0"
4000  END
```

GREYRESULT PROGRAM

```
5  HIMEM: 28000
10 D$ = ""
20  PRINT D$"OPEN RESULT"
30  PRINT D$"READ RESULT"
40  DIM AR(40,40)
45  DIM AV(40,40)
50  FOR Y = 1 TO 40
60  FOR X = 1 TO 40
70  INPUT AR(X,Y)
80  NEXT : NEXT
90  PRINT D$"CLOSE RESULT"
100  FOR Y = 5 TO 30
110  FOR X = 10 TO 30
120 AV(X,Y) = AR(X,Y) + AR(X,Y +
     1) + AR(X,Y - 1) + AR(X + 1,
     Y) + AR(X - 1,Y)
130  NEXT : NEXT
132  PRINT D$"PR#1"
134  PRINT  CHR$ (15)
136  PRINT  CHR$ (27)"3" CHR$ (37
     )
138  GOTO 210
140  FOR Y = 5 TO 30
150  FOR X = 10 TO 30
160 Z =  INT (AV(X,Y))
170  IF Z > 9 GOTO 190
180  PRINT " ";
190  PRINT Z; SPC( 1);
200  NEXT : PRINT : NEXT
210 G = 29952
220 W = 30208
240 AC = 30720
250 DN = 30976
260  FOR J = 0 TO 100
262  POKE W + J,11
264  POKE AC + J,0
266  POKE DN + J,0
268  POKE G + J,0
270  NEXT
300  FOR Y = 5 TO 30
400  FOR X = 10 TO 30
500 A = AV(X,Y)
600 A =  INT (A)
1360  POKE G + X,A
1400  NEXT
1500  CALL 32768
1600  NEXT
```

NEWGREY PROGRAM

```
            LST   OFF
 OK         =     $C1C1
 PRT        =     $C090
 LINE       =     $1E          ;LSB
 LPLUS      =     $1F          ;MSB
 *G IS STARTING GREY LEVEL ARRAY
 G          =     29952
 *W IS WIDTHS ARRAY
 W          =     30208
 *GREY INCREMENTS PER DOT:
 DGY        =     30720        ;HORIZ
 DGX        =     30976        ;VERT
 *PRINTER MACRO
            DO    0
 P          MAC
 TST        LDA   OK
            BMI   TST
            LDA   ]1
            STA   PRT
            <<<
            FIN
 *GRAPHICS MACRO 3 PAGES OF LINE
```

```
*MAKE 768 WIDE PIX(960 FULLWID)
          DO   0
GR        MAC
          LDA  #$7B
          STA  LPLUS
          LDA  #0
          STA  LINE
          >>>  P/#27
          >>>  P/#76
          >>>  P/#0
          >>>  P/#3
          LDX  #3
          LDY  #0
SEND      >>>  P/(LINE),Y
          INY
          BNE  SEND
          INC  LPLUS
          DEX
          BNE  SEND
          >>>  P/#10
          >>>  P/#13
          <<<
          FIN
*INITIALISATION FOR ONE LINE
          >>>  P/#27
          >>>  P/#51
          >>>  P/#21
*STORAGE LOC FOR LINE:
          LDA  #$7B
          STA  LPLUS
          LDA  #0
          STA  LINE
          LDY  #0
          LDX  #3
          STX  C3
*CLEAR LINE SINCE AND IS USED
CLR       STA  (LINE),Y
          INY
          BNE  CLR
          INC  LPLUS
          DEC  C3
          BNE  CLR
          LDA  #7
          STA  C7
*OUTER LOOP OCCURS SEVEN TIMES
OUTR      LDY  #0
          STY  CW
          STY  C
          LDA  #$7B
          STA  LPLUS
          LDX  #3
          STX  C3
          LDA  G
          STA  GRY
          LDA  W
          STA  CC
*DGY IS HORIZONTAL INCR OF GREY
          LDA  DGY
          STA  DEL
*LOOP ALL THE WAY ACROSS ONE LINE
*OF DOTS (768 STEPS)
ACR       DEC  S
          BNE  ONW
*GET A NEW RANUM EACH 3 DOTS
          JSR  $300
          LDA  $371
          STA  T
          LDA  #3
          STA  S
ONW       LDA  T
          CLC
*CENTRAL STEP: ADD T TO GRY AND
*IF CARRY SET PRINT A DOT
          ADC  GRY
          BCC  NOT
```

```
         LDX   C7
         LDY   C
         LDA   (LINE),Y
*DOT IN PROPER VERTICAL PLACE
         ORA   HOT,X
         STA   (LINE),Y
NOT      LDA   T
*NON RANDOMISE T BY ADDING 83
         ADC   #83
         STA   T
*CALC NEW GREY ETC.
         DEC   CC
         BNE   STILL
*NEW PATCH CHANGING  ALL PARA
         INC   CW
         LDX   CW
         LDA   DGY,X
         STA   DEL
         LDA   G,X
         STA   GRY
         LDA   W,X
         STA   CC
         LDA   DGX,X
         CLC
         ADC   G,X
         STA   G,X
         JMP   SKIP
STILL    LDA   GRY
         CLC
         ADC   DEL
         STA   GRY
SKIP     INC   C
         BNE   ACR
         INC   LPLUS
         DEC   C3
         BNE   ACR
         DEC   C7
         BNE   AGAIN
         >>>   GR
UP       RTS
AGAIN    JMP   OUTR
HOT      DFB   0,1,2,4,8,16,32,64
C        DFB   #0
C7       DFB   #0
GRY      DFB   #0
S        DFB   #3
T        DFB   #0
DEL      DFB   #0
C3       DFB   #3
CW       DFB   #0
CC       DFB   #0
```

RANUM PROGRAM

```
         ORG   $300
         LDX   #$F3
SUBLOOP  ASL   BYT1
         ROL   BYT2
         ROL   BYT3
         ROL   BYT4
         SEC
         LDA   BYT1
         SBC   REF
         PHA
         LDA   BYT2
         SBC   R2
         PHA
         LDA   BYT3
         SBC   #255
         PHA
```

```
             LDA   BYT4
             SBC   #3
             PHA
             BCC   LESS
             PLA
             STA   BYT4
             PLA
             STA   BYT3
             PLA
             STA   BYT2
             PLA
             STA   BYT1
             BCS   INCR
   LESS      PLA
             PLA
             PLA
             PLA
   INCR      INX
             BNE   SUBLOOP
             LDA   #1
             CMP   BYT1
             BNE   AGIN
             CMP   BYT2
             BNE   AGIN
             CMP   BYT3
             BNE   AGIN
             CMP   BYT4
             BNE   AGIN
             LDA   REF
             CLC
             ADC   #2
             STA   REF
             CMP   #01
             BNE   AGIN
             LDA   R2
             CLC
             ADC   #1
             STA   R2
   AGIN      RTS
   BYT1      DFB   #1
   BYT2      DFB   #1
   BYT3      DFB   #1
   BYT4      DFB   #1
   R2        DFB   #217
   REF       DFB   #1
```

We claim:

1. An apparatus for detecting radioactive sources on a test specimen, the apparatus comprising:

a counter having a gas filled chamber, said chamber being formed by an electrically conductive planar window and a parallel semiconductive surface spaced from said window, and adapted for having an electric field imposed within said chamber by a voltage differential between said window and said semiconductive surface;

an encoder surface spaced from said semiconductive surface and having geometrically arrayed elements thereon for receiving an electrical charge induced on said elements by an ion avalanche occurring within said chamber in response to entry of a radioactive particle into said chamber;

a dielectric layer between said semiconductive surface and said encoder surface, said semiconductive surface forming a coating on one side of said layer and said arrayed elements forming a coating on the opposite side of said layer;

means for coupling each said element to a row wire and to a column wire which are electrically isolated from each other whereby a preselected fraction of coupled charge current is transferred to each wire defining an element, the amplitude of the respective transferred charge fraction depending upon the location of the charge current relative to the element;

a plurality of charge sensitive integrating amplifiers, one such amplifier being connected to each row wire, respectively, and one such amplifier being connected to each column wire, respectively;

a plurality of sample and hold circuits, each of such circuits being connected to a respective one of said amplifiers for selectively sampling and holding an analog signal created by said induced electrical charge;

means controlling said sample and hold circuits for selectively holding said analog signal when the summed output of all said sample and hold circuits exceeds a predefined threshhold level; and means for converting each said analog signal into a corresponding digital signal and for calculating the location of each corresponding induced electrical charge on said encoder surface based on the relative amplitude of each analog signal on respective row wires and column wires.

2. The apparatus recited in claim 1 wherein said arrayed elements comprise at least thirty six substantially square elements of equal dimensions, each such element being spaced equally from all adjacent elements by a distance less than the lateral dimension of each element- the total area occupied by said arrayed elements being greater than the area of said test specimen.

3. The apparatus recited in claim 1 wherein said arrayed elements comprise a plurality of perpendicular, regularly spaced electrically insulated conductors, each such conductor being separated from adjacent parallel conductors by a selected electrical impedance.

4. The apparatus recited in claim 3 further comprising a plurality of integrating amplifiers connected to said electrical impedances at regularly spaced intervals dependent upon the desired radioactive source detection resolution and signal to noise ratio.

5. A system for locating, mapping and displaying radioactive sources on a test specimen; the system comprising:

counter means for detecting radioactive events by producing corresponding ion avalanche effects;

encoder means for defining the detected events in the form of induced electrical charges at a location corresponding to the position of the event on the test specimen;

mapping means for producing analog electrical signals corresponding to said induced electrical charges, calculating the location of said induced electrical charges based on the relative amplitudes of said analog electrical signals, and displaying an image of each detected event on a defined geometrical array.

6. The system recited in claim 5 wherein the counter means comprises:

an electrically conductive planar window, a dielectric layer having a semiconductive surface parallel to and spaced from said window to form a chamber between said window and said semiconductive surface, means for sealing said chamber, a gas mixture of selected constituent gases contained within said chamber, and means for applying for electric field of selected magnitude across said chamber, said window being in a state of radial tension that may be selectively varied for assuring substantial flatness thereof.

7. The system recited in claim 5 wherein the encoder means comprises:

a plurality of geometrically arrayed electrically conductive elements arranged symmetrically on a common planar surface;

a matrix of conducting wires arranged in substantially equal pluralities of rows and columns, each such row being associated with a selected plurality of elements and each such column being associated with a selected plurality of elements whereby a selected row and column define one and only one element.

8. The encoder system recited in claim 7 wherein each said element is square in shape.

9. The encoder system recited in claim 7 wherein said means for coupling each element to a row wire and each element to a column wire comprises respective capacitors.

10. The system recited in claim 5 wherein the encoder means comprises:

a matrix of conducting paths arranged symmetrically on a common planar surface whereby to define a plurality of row paths and a plurality of columm paths, the respective pluralities of paths being each connected to selected terminals of a voltage divider network, a first plurality of charge sensitive integrating amplifiers respectively connected to equally spaced points along said row paths network and a second plurality of charge sensitive integrating amplifiers respectively connected to equally spaced points along said column path network, means for coupling discrete electrical charge current only to those conducting paths within relative proximity to said discrete current, whereby the relative amplitude of the charge current delivered to amplifiers in each of said first and second pluralities defines the location of each discrete electrical charge current.

11. The system recited in claim 5 wherein the mapping means comprises:

a plurality of charge sensitive integrating amplifiers, one such amplifier being connected to each row wire, respectively, and one such amplifier being connected to each column wire, respectively;

a plurality of sample and hold circuits, each of such circuits being connected to a respective one of said amplifiers for selectively sampling and holding the output signal thereof;

means controlling said sample and hold circuits for selectively holding said output signal when the summed output of all said signal and hold circuits exceeds a predefined threshhold level; and means for converting each said analog signal into a corresponding digital signal.

12. The system recited in claim 11 further comprising means for analyzing said digital signals and for displaying the relative count and positions of corresponding radioactive events on an array simulation of said counter.

* * * * *